(12) United States Patent
Matsubara et al.

(10) Patent No.: US 9,667,983 B2
(45) Date of Patent: May 30, 2017

(54) IMAGE PROCESSING APPARATUS AND CONTROL METHOD FOR THE SAME INCLUDING ESTIMATION AND SCHEDULING

(71) Applicant: Renesas Electronics Corporation, Kawasaki-shi (JP)

(72) Inventors: Katsushige Matsubara, Kawasaki (JP); Takayuki Matsumi, Tokyo (JP); Seiji Mochizuki, Kawasaki (JP); Kenichi Iwata, Kawasaki (JP); Toshiyuki Kaya, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/620,081

(22) Filed: Feb. 11, 2015

(65) Prior Publication Data
US 2015/0245045 A1 Aug. 27, 2015

(30) Foreign Application Priority Data

Feb. 21, 2014 (JP) .................................. 2014-031387

(51) Int. Cl.
*H04N 19/436* (2014.01)
*G06T 1/20* (2006.01)
*H04N 19/91* (2014.01)

(52) U.S. Cl.
CPC ............. *H04N 19/436* (2014.11); *G06T 1/20* (2013.01); *H04N 19/91* (2014.11)

(58) Field of Classification Search
CPC ......... H04N 19/436; H04N 19/91; G06T 1/20
See application file for complete search history.

(56) References Cited

U.S. PATENT DOCUMENTS

| 5,617,082 A | 4/1997 | Denison et al. |
| 5,848,403 A * | 12/1998 | Gabriner ................... G06F 9/50 706/13 |
| 6,065,036 A * | 5/2000 | Hisatake ............... G06F 9/4881 718/100 |
| 6,578,005 B1 * | 6/2003 | Lesaint .................. G06Q 10/06 705/7.14 |
| 6,904,094 B1 * | 6/2005 | Liu ........................ H04N 19/61 375/240.13 |

(Continued)

FOREIGN PATENT DOCUMENTS

JP 2006-146937 A 6/2006

*Primary Examiner* — Utpal Shah
(74) *Attorney, Agent, or Firm* — McGinn IP Law Group, PLLC

(57) ABSTRACT

An image processing apparatus includes a request receiving unit that receives requests from a plurality of pieces of content, a variable-length code processing unit which decodes or encodes the content, a plurality of image signal processing units executing tasks according to the requests in parallel, an estimating unit that estimates estimate time by which a process of the task is completed in each of the image signal processing units on the basis of a parameter of decoding or encoding used in the variable-length code processing unit, and a scheduling unit that schedules tasks executed by the plurality of image signal processing units on the basis of estimation time estimated by the estimating unit.

18 Claims, 16 Drawing Sheets

(56) References Cited

U.S. PATENT DOCUMENTS

| | | | | |
|---|---|---|---|---|
| 7,140,016 B2* | 11/2006 | Milovanovic | ......... | G06F 9/4887 709/231 |
| 7,464,379 B2* | 12/2008 | Kanai | ................ | G06F 1/3203 713/375 |
| 8,031,766 B2* | 10/2011 | Cote | .................. | H04N 19/61 375/240.01 |
| 8,219,702 B2* | 7/2012 | Kohno | ............... | H04N 7/17318 709/226 |
| 8,510,538 B1* | 8/2013 | Malewicz | ................ | G06F 7/38 712/220 |
| 8,544,017 B1* | 9/2013 | Prael | ................... | G06F 9/5072 709/201 |
| 9,213,574 B2* | 12/2015 | Faruquie | ................ | G06F 9/50 |
| 9,292,344 B2* | 3/2016 | Ryshakov | ............ | G06F 9/4881 |
| 2006/0112390 A1* | 5/2006 | Hamaoka | .............. | G06F 9/5066 718/102 |
| 2006/0288397 A1* | 12/2006 | Uchida | ............ | H04N 21/26208 725/115 |
| 2008/0013628 A1* | 1/2008 | Lu | ...................... | H04N 19/172 375/240.12 |
| 2008/0066072 A1* | 3/2008 | Yurekli | ................. | G06Q 10/06 718/104 |
| 2009/0024985 A1* | 1/2009 | Hommura | .......... | G06F 11/3419 717/129 |
| 2011/0035751 A1* | 2/2011 | Krishnakumar | ...... | G06F 9/4881 718/103 |
| 2011/0191781 A1* | 8/2011 | Karanam | ................. | G06F 9/50 718/104 |
| 2013/0279685 A1* | 10/2013 | Kohler | ............... | H04M 3/5175 379/265.02 |
| 2013/0290972 A1* | 10/2013 | Cherkasova | ......... | G06F 9/5083 718/103 |
| 2014/0181825 A1* | 6/2014 | He | ...................... | G06F 9/5027 718/102 |

* cited by examiner

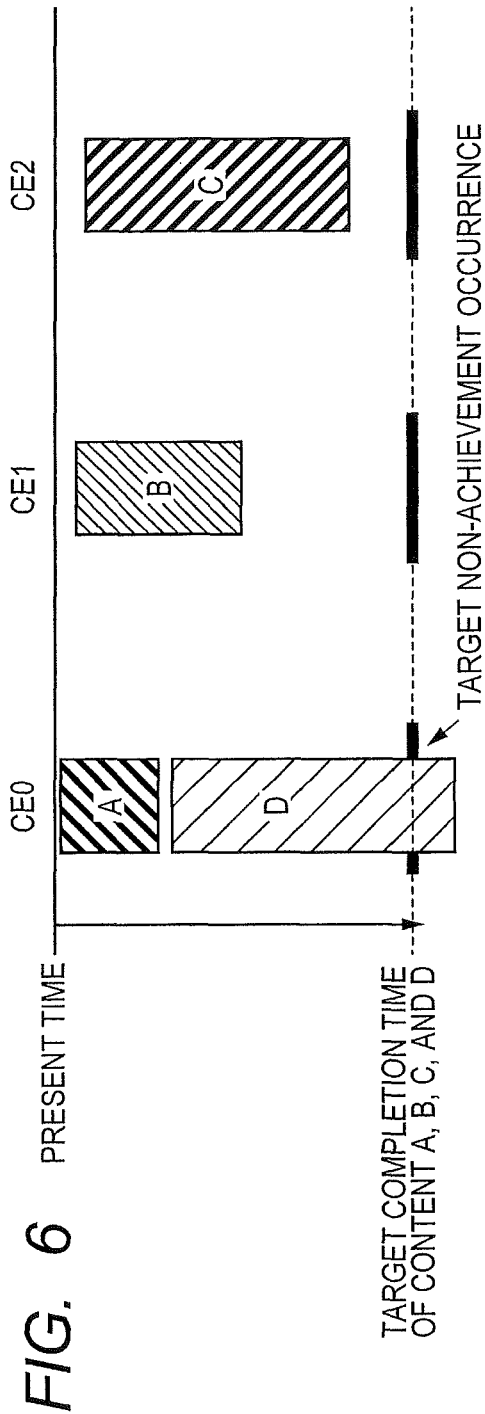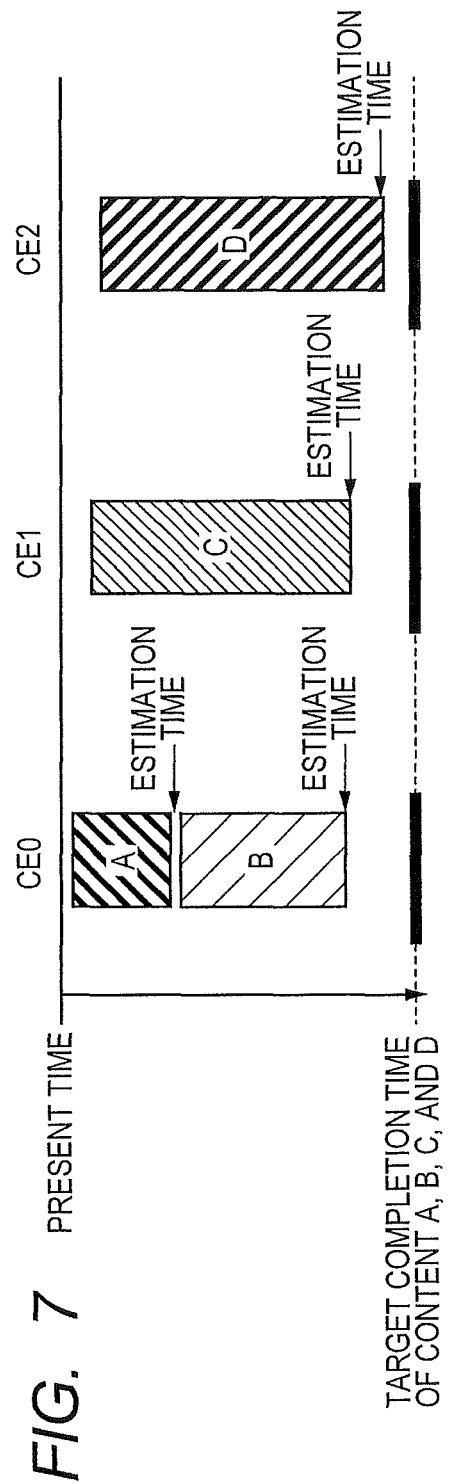

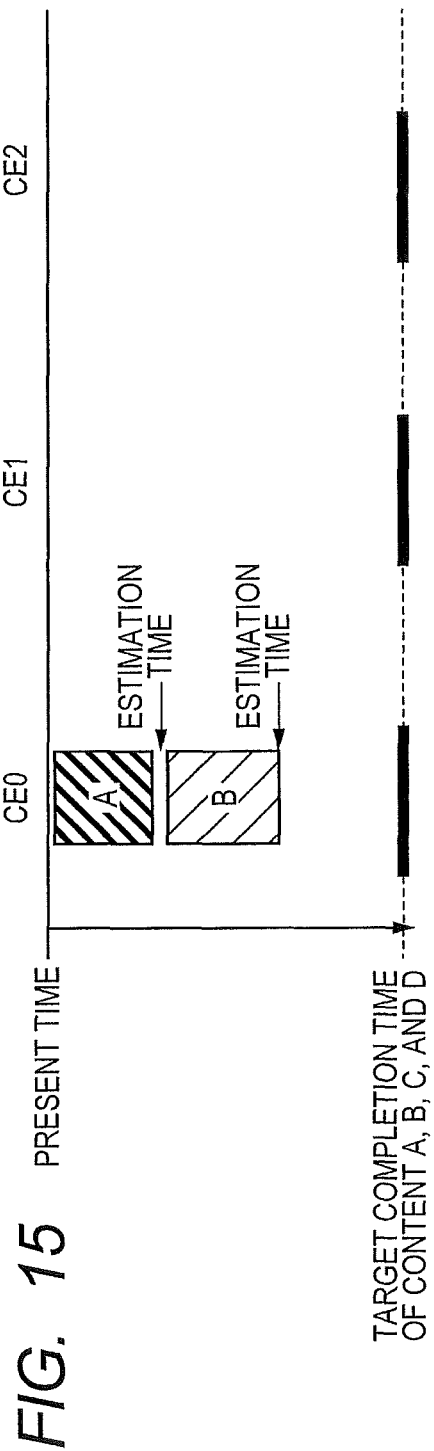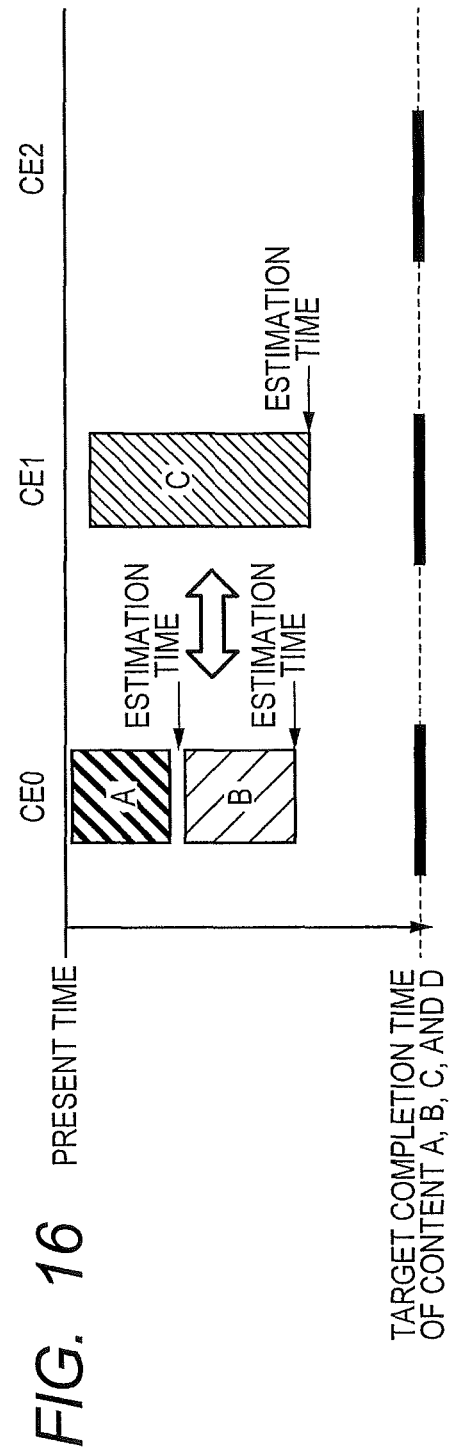

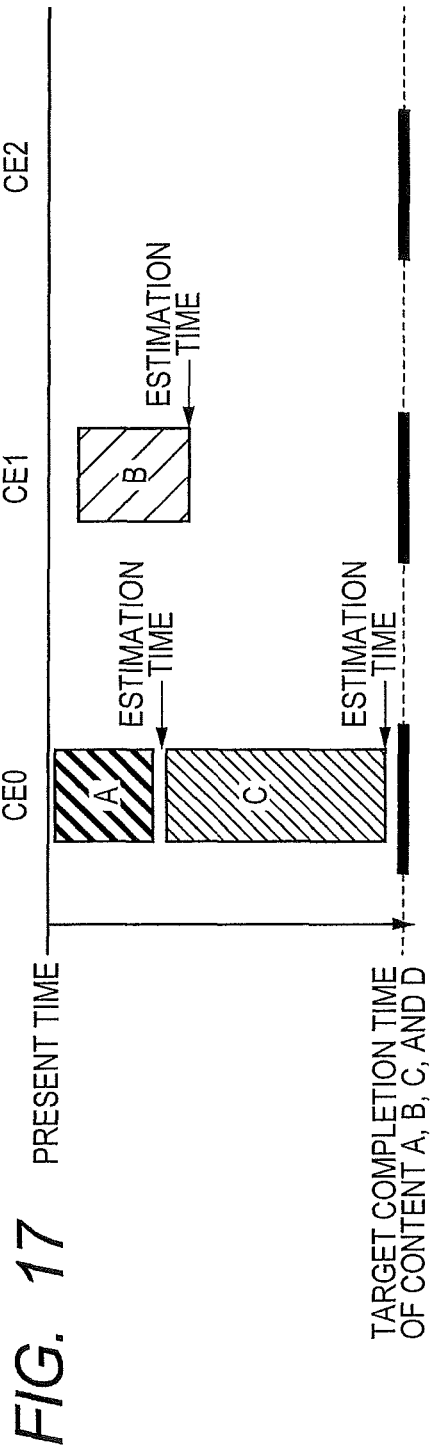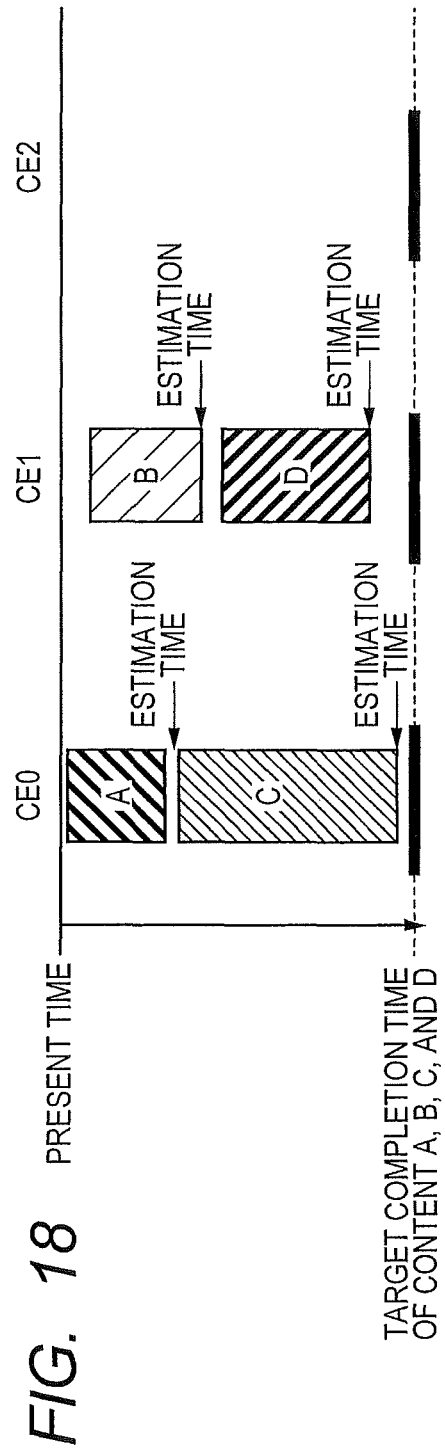

IMAGE PROCESSING APPARATUS AND CONTROL METHOD FOR THE SAME INCLUDING ESTIMATION AND SCHEDULING

CROSS-REFERENCE TO RELATED APPLICATIONS

The disclosure of Japanese Patent Application No. 2014-031387 filed on Feb. 21, 2014 including the specification, drawings and abstract is incorporated herein by reference in its entirety.

BACKGROUND

The present invention relates to an image processing apparatus and a control method for the same.

Patent literature 1 discloses a method of increasing use efficiency of a processor in a multi-processor system. In the multi-processor system described in the patent literature 1, on the basis of evaluation of main sets of operation conditions, a strict real-time schedule and a pseudo real-time schedule are alternatively selected.

RELATED-ART LITERATURE

Patent Literature

[Patent Literature 1]
Japanese Unexamined Patent Application Publication No. 2006-146937

SUMMARY

In the strict real-time schedule, a task is executed at predetermined fixed timings. In the strict real-time schedule, the performance is assured, however, the operation efficiency of a processor decreases. On the other hand, in the pseud real-time schedule, tasks are executed in a best-effort manner using predetermined fixed priority degree. In this case, the operation efficiency of a processor can be improved but the performance is not assured. In Patent literature 1, by comparing the number of entries occupying in a buffer with a threshold, the pseudo real-time scheduling and strict real-time scheduling are switched.

In the pseudo real-time scheduling, tasks are scheduled in processors in a best-effort manner. Since end time of each of the tasks cannot be presumed, only scheduling according to predetermined fixed priority order can be performed. As a result, when process amounts of the tasks fluctuate and the task load is biased on a specific processor, a problem occurs such that scheduling at high efficiency cannot be performed.

The other problems and novel features will become apparent from the description of the specification and the appended drawings.

According to an embodiment, an image processing apparatus estimates estimation time in which the task is completed in each of a plurality of processing units on the basis of a parameter of decoding or encoding and schedules tasks to be executed by the processing units on the basis of the estimated estimation time.

As modes of the present invention, a method or a system obtained by replacing the apparatus of the embodiment, a program which makes a computer execute processes of the apparatus or apart of the apparatus, a system having the apparatus, and the like are also valid.

According to the embodiment, tasks can be scheduled efficiently.

BRIEF DESCRIPTION OF THE DRAWINGS

FIG. 6 is a diagram for explaining scheduling without using estimation time.

FIG. 7 is a diagram for explaining scheduling using estimation time.

FIG. 15 is a diagram for explaining the scheduling method according to the third embodiment.

FIG. 16 is a diagram for explaining the scheduling method according to the third embodiment.

FIG. 17 is a diagram for explaining the scheduling method according to the third embodiment.

FIG. 18 is a diagram for explaining the scheduling method according to the third embodiment.

DETAILED DESCRIPTION

Figure 1:
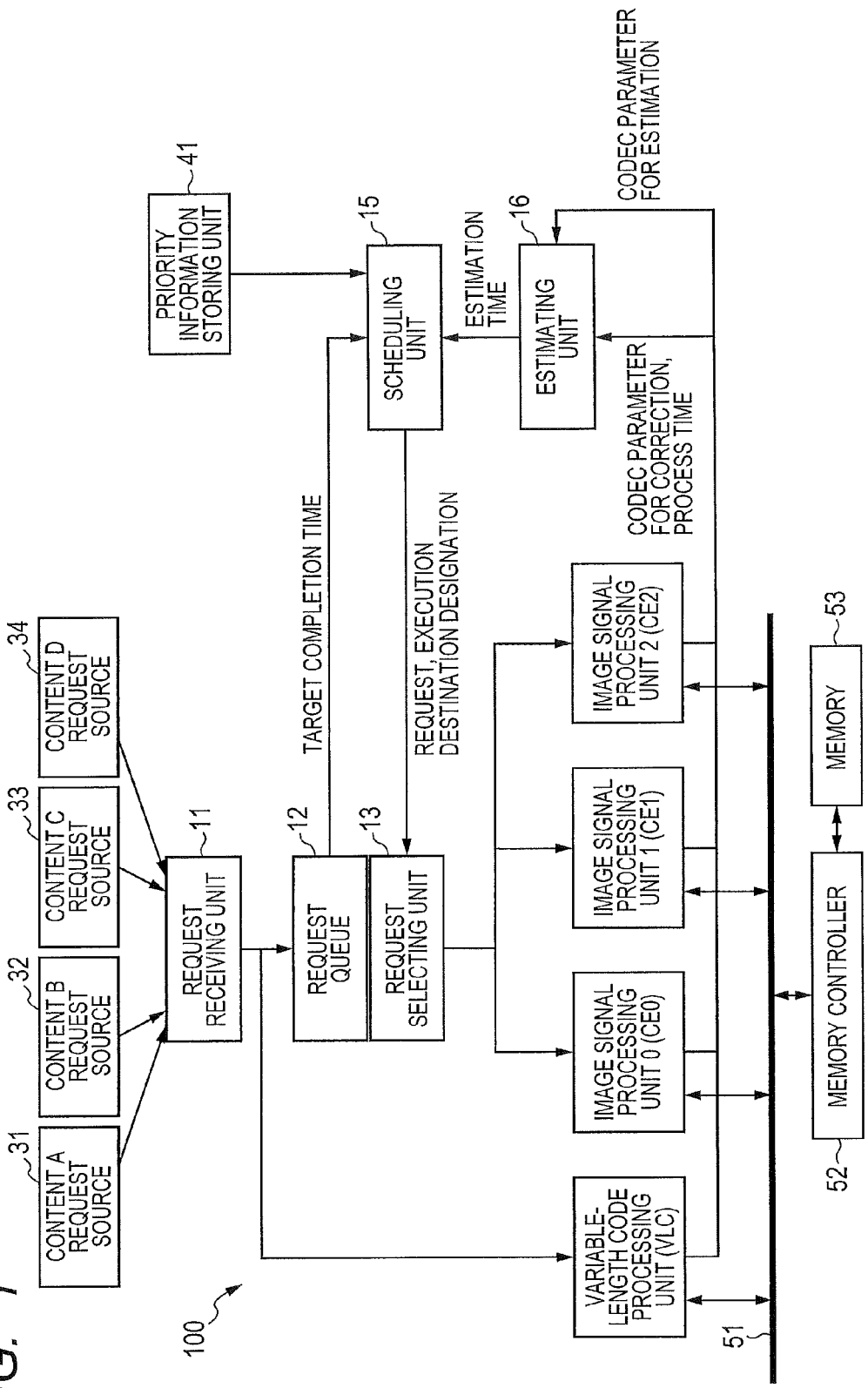
FIG. 1 is a block diagram illustrating the configuration of an image processing apparatus according to a first embodiment.

To clarify description, the following description and drawings are properly omitted and simplified. Elements described in the drawings as function blocks performing various processes are configured by hardware such as a CPU (Central Processing Unit), a memory, and other circuits. As software, the elements are realized by a program loaded in a memory and the like. It is therefore to be understood by a person skilled in the art that the function blocks can be realized in various forms by, although not limited, only hardware, only software, or a combination of hardware and software. In the drawings, the same reference numeral is designated to the same element, and repetitive description will not be given as necessary.

The above-described program is stored by using non-transitory computer readable media of various types and can be supplied to a computer. The non-transitory computer readable media include tangible storage media of various types. Examples of the non-transitory computer readable media include magnetic recording media (such as a flexible disk, a magnetic tape, and a hard disk drive), magnetooptical recording media (such as a magnetooptic disk), a CD-ROM (Read Only Memory), a CD-R, a CD-R/W, and semiconductor memories (such as a mask ROM, a PROM (Programmable ROM), an EPROM (Erasable PROM), a flash ROM, and a RAM (Random Access Memory)). The program may be supplied to a computer by any of transitory computer readable media of various types. Examples of the transitory computer readable media include an electric signal, an optical signal, and electromagnetic wave. The transitory computer readable media can supply a program to a computer via a wired communication path such as an electric wire or an optical fiber or a wireless communication path.

First Embodiment

An image processing apparatus of a first embodiment is a processor system performing an image process such as coding or decoding on content. The image processing apparatus is a multi-processor system having a plurality of processors. The plurality of processors perform image processes in parallel. More concretely, the image processing apparatus performs video coding/decoding on a plurality of pieces of content in parallel. The image processing apparatus according to the embodiment and a control method for the same will be described with reference to FIG. 1. FIG. 1 is a block diagram illustrating a general configuration of the image processing apparatus.

An image processing apparatus 100 has a request receiving unit 11, a request queue 12, a request selecting unit 13, a variable-length code processing unit VLC, an image signal processing unit CE0, an image signal processing unit CE1, an image signal processing unit CE2, an estimating unit 16, a scheduling unit 15, a priority information storing unit 41, a data bus 51, a memory controller 52, and a memory 53. Description will be given on assumption that the image processing apparatus 100 is a decoder for reproducing video content in a real-time manner.

The request receiving unit 11 receives requests from request sources 31 to 34. The request receiving unit 11 receives requests for content A to D from the request sources 31 to 34, respectively. Content requested from the request source 31 is content A, content requested from the request source 32 is content B, content requested from the request source 33 is content C, and content requested from the request source 34 is content D. The content A to D is independent content.

Hereinbelow, for simpler explanation, the request for content A will be called request A. Similarly, the requests for the content B, C, and D will be called requests B, C, and D, respectively. Further, a task executed by the image processing apparatus 100 in accordance with the request A will be called task A. Similarly, tasks executed by the image processing apparatus 100 in accordance with the requests B, C, and D will be called tasks B, C, and D, respectively. For example, a process for reproducing the content A is a task A.

For example, the request source 31 requests the image processing apparatus 100 to reproduce the content A. The request source 31 sequentially transmits the request A to the image processing apparatus 100. To reproduce the content A, the request source 31 repeatedly transmits the request A to the image processing apparatus 100. For example, the request source 31 transmits it in a picture unit (frame unit or field unit) of the content A. The image processing apparatus 100 reproduces the content transmitted from the request source 31 in a real-time manner. That is, it performs, as required, an image process on content data whose request is accepted.

The requests transmitted from the request sources 31 to 34 include content data encoded by a predetermined coding method. For example, content data is compressed by using a Huffman code. As the coding format, for example, H.264/MPEG-4 AVC or the like can be used.

The request queue 12 stores the request received by the request receiving unit 11. The request queue 12 can store a plurality of requests. When there is no empty space in the request queue 12, the request receiving unit 11 does not accept a request. According to a request, the request queue 12 outputs completion time as a target (hereinbelow, target completion time) to the scheduling unit 15.

The target completion time is time by which a task has to be completed to perform reproduction of content or the like without delay. The target completion time is set for each request. That is, when tasks executed by the image signal processing units CE0 to CE2 for a request are completed by the target completion time, the content is reproduced without delay. On the other hand, in the case where a task corresponding to content cannot be completed by the target completion time, a frame drop or the like may occur at the time of reproducing content.

The request selecting unit 13 selects the image signal processing units CE0 to CE2 executing a task in accordance with a request stored in the request queue 12. For example, the request selecting unit 13 selects the image signal processing unit CE0 as a processor executing the task A for the request A. In addition, the request selecting unit 13 selects the image signal processing unit CE executing a task in accordance with a schedule set in the scheduling unit 15.

The variable-length code processing unit VLC is a codec processing unit decoding a variable-length code. The variable-length code processing unit VLC performs a process of decoding content data from the request sources 31 to 34. The variable-length code processing unit VLC performs, for example, the decoding process on a Huffman code to generate uncompressed data. The memory controller 52 buffers the content data, for example, in accordance of reception of requests. Alternatively, the variable-length code processing unit VLC may decode content data having high bit rate before content data having low bit rate.

Further, the variable-length code processing unit VLC outputs a codec parameter for estimation to the estimating unit 16. The codec parameter for estimation is used for estimating completion time in the estimating unit 16. For example, the type of coding and the number of motion vectors are codec parameters for estimation.

The image signal processing units CE0 to CE2 are image processors executing a task according to a request. In the following description, in the case of describing the image signal processing units CE0 to CE2 without identifying them, they will be described as the image signal processing unit CE. The image signal processing unit CE performs an image process on content data subjected to the decoding process in the variable-length code processing unit VLC.

The image signal processing units CE0 to CE2 execute, for example, mathematical signal processes such as inverse discrete cosine transform (IDCT). It makes the content data reproducible.

The image signal processing units CE0 to CE2 execute signal processes in parallel. For example, while the image signal processing unit CE0 performs an image process on the content A, the image signal processing unit CE1 performs an image process on the content B, and the image signal processing unit CE2 performs an image process on the content C. In such a manner, the image processing apparatus 100 can reproduce different content in parallel. Alternatively, in the case where the requests A are continuous, the image signal processing units CE0 to CE2 may process the tasks A in parallel. The image signal processing units CE0 to CE2 are equivalent processors.

The image signal processing unit CE outputs a codec parameter for correction in the image signal process to the estimating unit 16. The codec parameter for correction is used to correct estimation completion time in the estimating unit 16. For example, the type of coding, the number of motion vectors and the like are codec parameters for correction. Alternatively, the number of bus access times may be used as a codec parameter for correction. Further, the image signal processing unit CE outputs process time required to complete a task to the estimating unit 16. The image signal processing unit CE associates the process time required for an actual task process with the codec parameter for correction and outputs the resultant to the estimating unit 16. The image signal processing unit CE outputs the process time of the task to the estimating unit 16 for each request.

The variable-length code processing unit VLC and the image signal processing unit CE process content data on a picture unit (frame unit or field unit) basis. The variable-length code processing unit VLC and the image signal processing unit CE are coupled to the memory controller 52 via the data bus 51. The memory controller 52 controls writing and reading of data to/from the memory 53. The memory 53 is, for example, a DDR (Double Data Rate) memory and buffers content data, a codec parameter, and the like.

For example, when the variable-length code processing unit VLC and the image signal processing unit CE perform a process, content data is written in the memory 53. Alternatively, when the variable-length code processing unit VLC and the image signal processing unit CE perform a process, necessary data is read from the memory 53. For example, the memory controller 52 writes/reads data for performing a variable-length code process by the variable-length code processing unit VLC to/from the memory 53. The memory controller 52 writes/reads data for performing the image signal process by the image signal processing unit CE to/from the memory 53. That is, by an access to the data bus 51 by the variable-length code processing unit VLC and the image signal processing unit CE, writing/reading of data to/from the memory 53 is executed.

The estimating unit 16 estimates time required for the task process by the image signal processing unit CE on the basis of a codec parameter for correction, a codec parameter for estimation, and process time. That is, the estimating unit 16 estimates the process time taken to execute a task according to a request as estimation time. The estimating unit 16 outputs the estimation time to the scheduling unit 15. The estimating unit 16 dynamically estimates estimation time on a process (picture) unit basis of content. The estimating unit 16 corrects estimation time as required by using parameters output from the variable-length code processing unit VLC and the image signal processing unit CE and actual process time.

The priority information storing unit 41 stores priority information of content. The priority information is information indicating content which is preferentially processed. That is, in the priority information storing unit 41, content to be preferentially processed in the content A to D is set. The priority information storing unit 41 outputs priority information to the scheduling unit 15.

The scheduling unit 15 schedules tasks executed by the image signal processing units CE0 to CE2 on the basis of the target completion time, priority information, and estimation time. That is, the scheduling unit 15 designates the image signal processing unit CE on which a task is executed for each of the requests stored in the request queue 12. For example, in the case where the requests A and B are stored in the request queue, the scheduling unit 15 associates a request and the image signal processing unit CE so that the image signal processing unit CE0 executes the task A and the image signal processing unit CE1 executes the task B.

The scheduling unit 15 dynamically determines execution start and an execution destination of each request. The scheduling unit 15 determines the execution order and the execution destination so as to satisfy the target completion time of each request by using estimation time. In the case where all of requests cannot be scheduled by the target completion time, the determination is made in accordance with a predetermined preferential order of content. That is, the execution order of tasks and the execution destination are determined in order according to the preference information. For example, when the priority on the content A is higher than those of the content B to D, the task A for the content A is preferentially executed.

The scheduling unit 15 designates a processor as a task execution destination for each request. The request selecting unit 13 selects the image signal processing unit CE in the task execution destination in accordance with the schedule set by the scheduling unit 15. Therefore, the request selecting unit 13 selects the image signal processing unit CE as a task execution destination from the image signal processing units CE0 to CE2. Thus, the image signal processing unit CE selected as an execution destination of a task executes the task.

Figure 2:
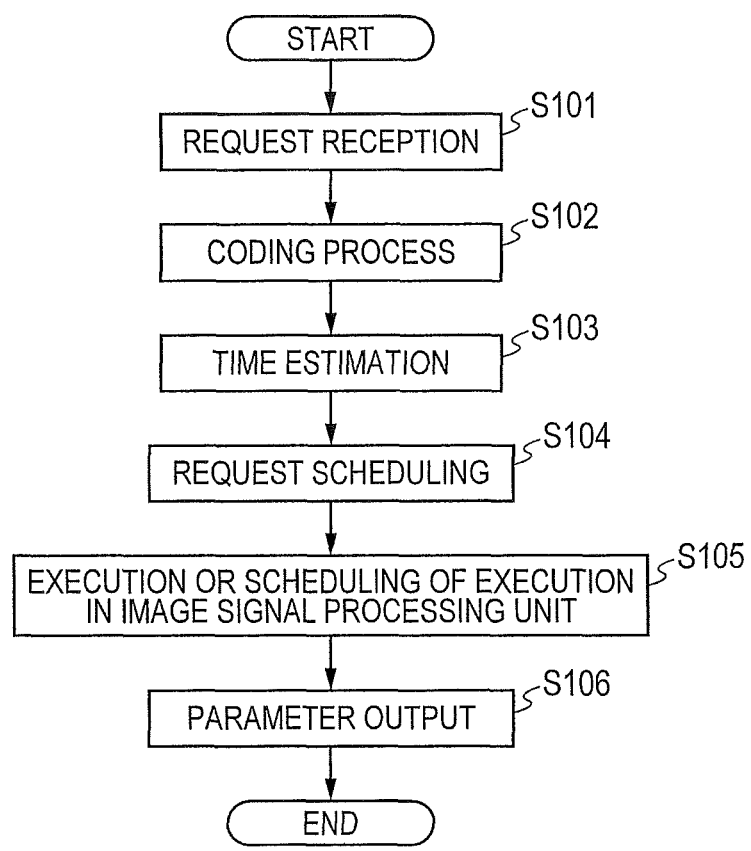
FIG. 2 is a flowchart illustrating a method of controlling the image processing apparatus according to the first embodiment.

Referring now to FIG. 2, the operation of the image processing apparatus 100 will be described. FIG. 2 is a flowchart illustrating general operations of the image processing apparatus 100.

First, the request receiving unit 11 receives a request from a request source (S101). Then, the variable-length code processing unit VLC executes a coding process on content data corresponding to the request (S102). The variable-length code processing unit VLC decodes the content data, for example, in request acceptance order. Further, the variable-length code processing unit VLC outputs a codec parameter for estimation to the estimating unit 16.

The estimating unit 16 estimates estimation time in which the image signal processing unit CE completes the task corresponding to the request (S103). The estimating unit 16 estimates estimation time on the basis of the codec parameter for estimation and the like output from the variable-length code processing unit VLC.

The scheduling unit 15 schedules the requests on the basis of the estimation time (S104). According to the schedule in the scheduling unit 15, the image signal processing unit CE executes a task or execution reservation is made for the image signal processing unit CE (S105). After completion of execution of the task by the image signal processing unit CE, the codec parameters for correction are output to the estimating unit 16 (S106). Specifically, actual process time is associated with the number of motion vectors and the type of coding, and the resultant is output to the estimating unit 16.

Figure 3:
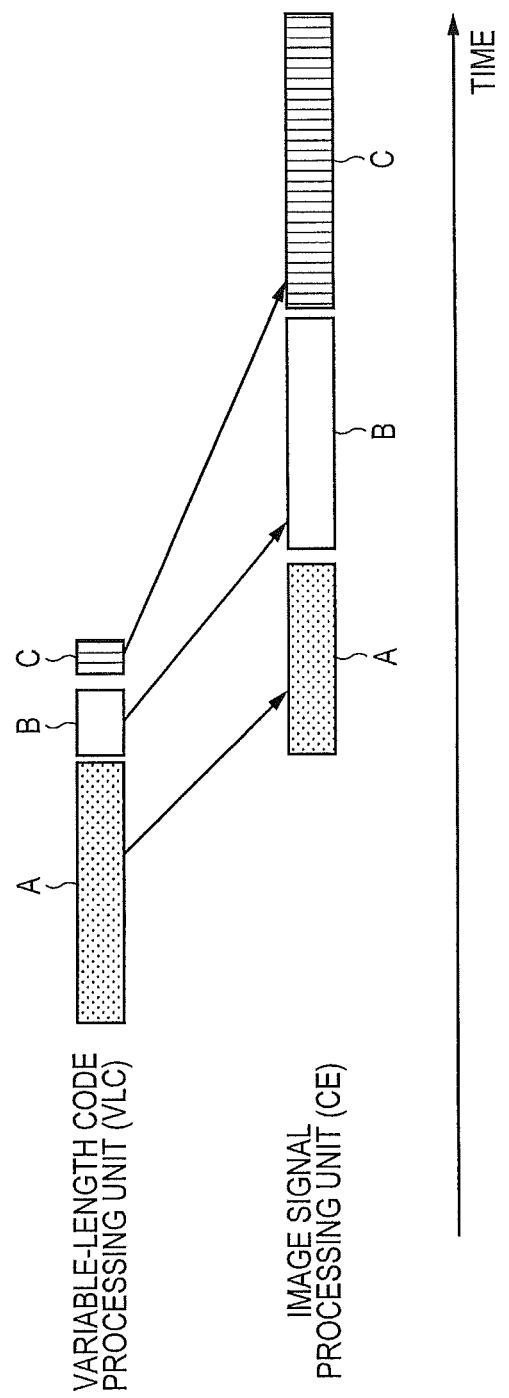
FIG. 3 is a diagram illustrating operation timings of processing units.

Each of the variable-length code processing unit VLC and the image signal processing unit CE receives a request. Specifically, after the variable-length code processing unit VLC receives a certain request, the image signal processing unit CE receives the request. FIG. 3 illustrates an example of decoder operation timings of the variable-length code processing unit VLC and the image signal processing unit CE. A process result in the variable-length code processing unit VLC is temporarily buffered in the memory 53. The image signal processing unit CE reads the process result from the memory 53 and performs a process. In such a manner, the variable-length code processing unit VLC performs a process in response to a request and, after that, the image signal processing unit CE performs a process.

Next, the estimating process in the estimating unit 16 will be described. The estimating unit 16 estimates process time of the image signal processing unit CE required to execute the task of the received request as estimation time. The estimating unit 16 obtains estimation time on the basis of a feedforward estimation value using a parameter output from the variable-length code processing unit VLC. That is, on the basis of the feedforward estimation value, process time which is output just before from the image signal processing unit CE is feedback-corrected.

Figure 4:
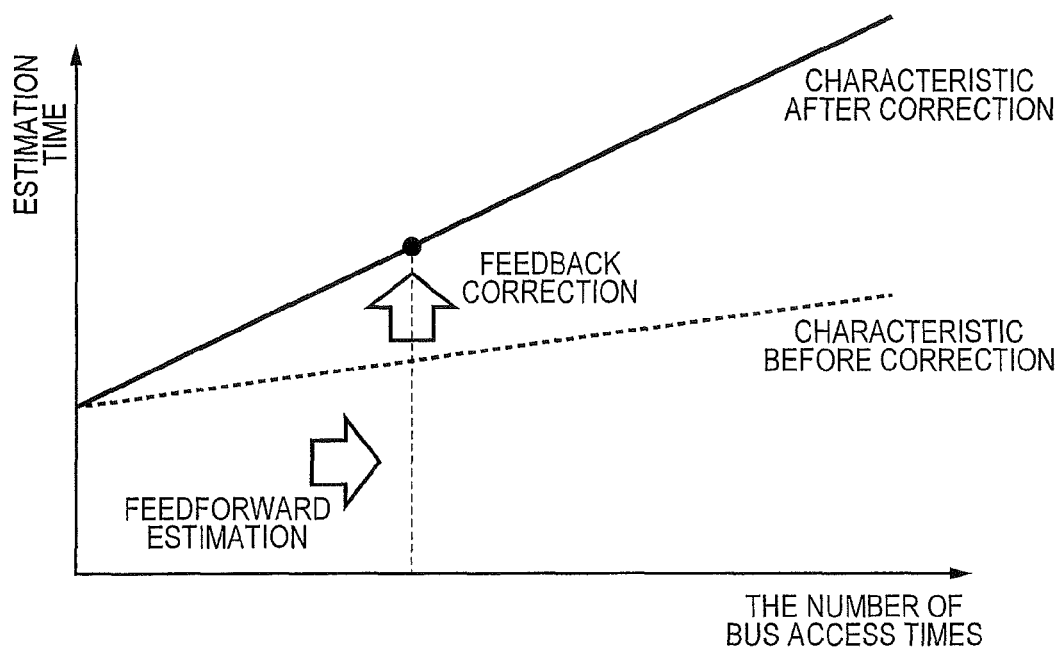
FIG. 4 is a graph illustrating an example of the relation between the number of bus access times and estimation time.

Estimation of the estimation time in the estimating unit 16 will be described in detail with reference to FIG. 4. FIG. 4 is a graph illustrating an example of the relation between the number of bus access times and estimation time. In FIG. 4, the horizontal axis indicates the number of bus access times of the image signal processing unit CE, and the vertical axis indicates estimation time. That is, FIG. 4 illustrates the characteristics of the estimation time on the number of bus access times.

In the variable-length code processing unit VLC, as parameters of decoding, the type of decoding, the number of motion vectors, and the like are determined. The estimating unit 16 obtains the number of accessing the bus by the image signal processing unit CE on the basis of the type of coding and the number of motion vectors. The estimating unit 16 estimates estimation time on the basis of the number of bus access times. Concretely, in the case where the type of coding is inter-frame coding, the process is more complicated as compared with inner-frame coding, so that the number of bus access times increases. Since the process becomes more complicated as the number of motion vectors increases, the number of bus access times increases. For example, with reference to a preset table, the estimating unit 16 obtains the number of bus access times from the type of coding and the number of motion vectors.

The variable-length code processing unit VLC outputs, as codec parameters, the type of coding and the number of motion vectors in response to a request to the estimating unit 16. The estimating unit 16 calculates the number of bus access times of the image signal processing unit CE in the request in accordance with the type of coding and the number of motion vectors. The estimating unit 16 estimates process time on the basis of the number of bus access times.

FIG. 4 illustrates the characteristics that the estimation time linearly increases in accordance with the number of bus access times. Therefore, the estimating unit 16 can feedforward-estimate process time on the basis of the number of bus access times. Further, using process time required to process a previous request in the image signal processing unit CE, the estimation time is feedback-corrected. For example, using process time required to process of a request of last time, the tilt of an increase amount of the estimation time and a reference value (intercept) are corrected. In FIG. 4, the characteristic after feedback correction using an actual value of process time is indicated by the solid line, and the characteristic before feedback correction is shown by the broken line. The estimating unit 16 estimates estimation time according to the number of bus access times by referring to the characteristic after feedback correction.

The scheduling unit 15 schedules requests by using the estimation time estimated by the estimating unit 16. That is, the scheduling unit 15 determines the image signal processing units CE processing requests and the order of them. The scheduling unit 15 changes the order of requests and the image signal processing units CE executing the requests to that each task does not exceed target completion time.

Figure 5:
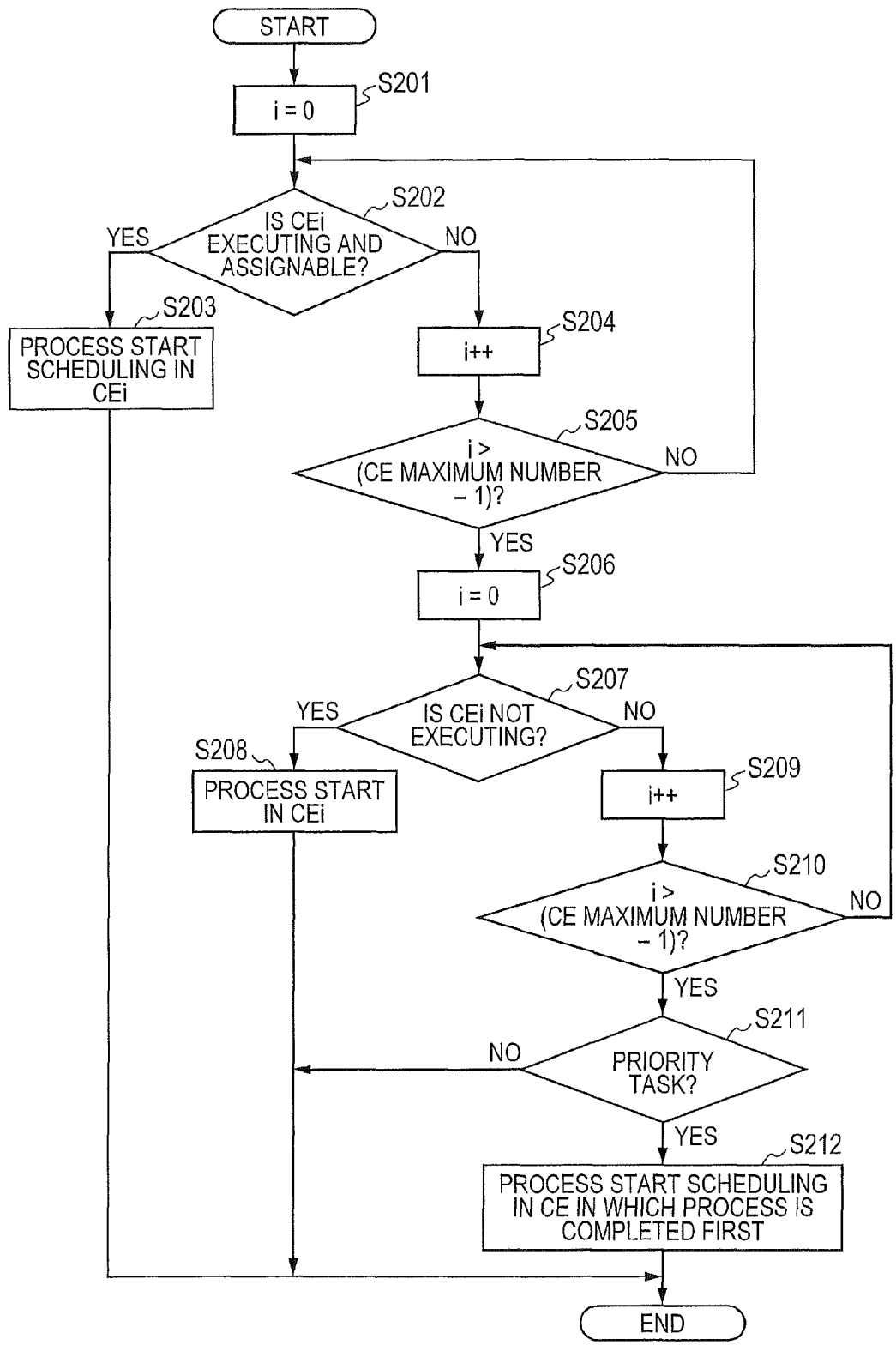
FIG. 5 is a flowchart illustrating a scheduling process in the image processing apparatus according to the first embodiment.

FIG. 5 depicts a flowchart of scheduling in the scheduling unit 15. First, when there is a request, i=0 is set (S201). Here, i denotes the number of identifying the image signal processing units CE0 to CE2. In the case of FIG. 1, that is, in the case where the number of the image signal processing units CE is three, i is 0, 1, and 2. In the case where i=0, it refers to the image signal processing unit CE0. In the case where i=1, it refers to the image signal processing unit CE1. In the case where i=2, it refers to the image signal processing unit CE2.

After setting i=0, whether the image signal processing unit CEi is executing and can be assigned is determined (S202). Specifically, in the case where a task of a request is executed in the image signal processing CEi (in this case, the image signal processing unit CE0 because i=0) executing another task, whether the task is completed by the target completion time or not is determined. In the case where the image signal processing unit CEi is executing and can be assigned, the scheduling unit 15 reserves process start in the image signal processing unit CEi (S203). The scheduling unit 15 finishes scheduling of the task. In the case where the process start reservation is made, after the task presently being executed by the image signal processing unit CEi is finished, the task of the request is executed. Obviously, in the case where process start reservation of another task is already made in the image signal processing unit CEi before process start is reserved in the image signal processing unit CEi, after completion of the process of the task presently being executed and the task on which the process start reservation is made, the image signal processing unit CEi executes the task of the request.

On the other hand, in the case where the image signal processing unit CEi is not executing and cannot be assigned, i is incremented (S204). Whether i exceeds "the maximum number of CE−1" or not is determined (S205). In the case where i is equal to or less than "the maximum number of CE−1" (NO in S205), the program returns to step S202. That is, whether the image signal processing unit CEi (in this case, i=1) is executing and can be assigned is determined. In such a manner, by repeating the processes in steps S202 to S205, the image signal processing units CEi which are executing and can be assigned can be retrieved in order from the image signal processing unit CE0.

In the case where i exceeds "the maximum number of CE−1" (YES in S205), that is, in the case where there is no image signal processing unit CEi which is executing and can be assigned, i=0 is set (S206). That is, when there is no image signal processing unit CE which can process a task in the image signal processing units CE executing processes, the program shifts to step S206. After setting i=0, whether the image signal processing unit CEi is not executing or not is determined (S207). Specifically, whether the image signal processing unit CE0 is processing a task or not is determined. In the case where the image signal processing unit CEi is not executing (YES in S207), the process is started in the image signal processing unit CEi (S208). Then, the scheduling unit 15 finishes the scheduling of the tasks. That is, immediately after the scheduling unit 15 determines the image signal processing unit CEi to execute a task, the image signal processing unit CEi starts executing the task.

On the other hand, when the image signal processing unit CEi is not executing (NO in S207), i is incremented (S209). Like in S205, whether i exceeds "the maximum number of CE−1" or not is determined (S210). In the case where i is equal to or less than "the maximum number of CE−1" (NO in S210), the program returns to step S207. That is, whether the image signal processing unit CEi (in this case, i=1) is processing a task or not is determined. In such a manner, by repeating the processes in steps S207 to S210, the image signal processing units CEi which are not executing tasks can be retrieved in order from the image signal processing unit CE0.

In the case where i exceeds "the maximum number of CE−1", that is, in the case where there is no image signal processing unit CEi which is executing (YES in S210), the program advances to S211. In step S211, the scheduling unit 15 refers to preferential information and determines whether the task of the request is a priority task or not. In the case where the task of the request is not a priority task (NO in S211), the routine is finished without reserving process start of the task. Whether the task of the request is a priority task or not is determined. In the case where the task of the request is a priority task (YES in S211), the process start is reserved in an image signal processing unit CE which completes the process fastest (S212). That is, the task process start is reserved in an image signal processing unit CE whose time at which a task being processed and all of tasks which are process start reserved are to be completed is fastest. After that, scheduling on the task is finished.

The scheduling unit 15 determines whether a task is a priority task or not on the basis of the priority information stored in the priority information storing unit 41. For example, in the case of a task related to content having high priority order, the scheduling unit 15 determines it as a priority task.

In such a manner, by placing priority on use-up of time until the target completion time of the image signal processing unit CEi which is operating, the scheduling unit 15 schedules tasks. For example, in the case where the image signal processing unit CE0 which is operating cannot complete a task by the target completion time, the task is assigned to the next image signal processing unit CE1. In such a manner, scheduling can be performed efficiently. Further, in the case any of the image signal processing units CE cannot complete tasks by the target completion time, the scheduling unit 15 performs scheduling so that the priority task is preferentially processed. In this way, content having high priority order can be reproduced preferentially.

Next, an example of receiving requests in order of content A, B, C, and D will be described. FIG. 6 illustrates an example of performing scheduling without using the scheduling method according to the embodiment. In other words, FIG. 6 illustrates an example that the estimating unit 16 does not estimate estimation time. FIG. 7 illustrates an example of performing scheduling by using the scheduling method according to the embodiment. In FIGS. 6 and 7, an example of assigning tasks of the content A to D to the image signal processing units CE0 to CE2 is illustrated. Further, the target completion time of the content A to D is the same.

In FIG. 6, the first task A is assigned to the image signal processing unit CE0. The second task B is assigned to the image signal processing unit CE1. The third task C is assigned to the image signal processing unit CE2. When the request D is received after the request C, any of the image signal processing units CE0 to CE2 cannot complete the task by the target completion time. That is, the task process for the request D exceeds the target completion time, and target non-achievement occurs. Almost half of the operation slot of the image signal processing unit CE1 remains, and the operation efficiency deteriorates.

In the scheduling method according to the embodiment, when the request receiving unit 11 receives the first request A, the estimating unit 16 estimates the estimation time of the task A. According to the estimation time, as illustrated in FIG. 7, the scheduling unit 15 assigns the task A to the image signal processing unit CE0. Next, when the second request B is received, the estimating unit 16 estimates estimation time of the task B. From the estimation time of the tasks A and B, the scheduling unit 15 determines that the process of the task B does not exceed the target completion time even when the task B is executed after the image signal processing unit CE0 processes the task A. Therefore, the scheduling unit 15 reserves the process start of the task B after the task A.

Next, when the request receiving unit 11 receives the request C, the estimating unit 16 estimates the estimation time of the task C. From the estimation time of the tasks A to C, the scheduling unit 15 determines that the process of the task C exceeds the target completion time when the task C is executed by the image signal processing unit CE0. Therefore, the scheduling unit 15 assigns the task C to the image signal processing unit CE1. When the task C is assigned, the image signal processing unit CE1 which is not executing starts processing of the task B.

Further, when the request receiving unit 11 receives the request D, the estimating unit 16 estimates the estimation time of the task D. At the time of reception of the request D, the image signal processing unit CE0 processes the task A, and the image signal processing unit CE1 processes the task C. From the estimation time of the tasks A to D, the scheduling unit 15 determines that the process of the task D exceeds the target completion time when the task D is executed by the image signal processing unit CE0 or CE1. Therefore, the scheduling unit 15 assigns the task D to the image signal processing unit CE2. When the task D is assigned, the image signal processing unit CE2 which is not executing starts processing of the task D.

As described above, in the scheduling method of the embodiment, the estimating unit 16 estimates the estimation time of a task in a real-time manner. Before assignment of the task B, the estimation time of the task B can be obtained. Therefore, execution start of the task B can be reserved subsequent to the task A in the image signal processing unit CE0. As a result, the tasks can be completed by the target completion time of all of the requests A to D, and scheduling of excellent operation efficiency can be realized. As described above, the estimating unit 16 estimates the process time of each of the requests. On the basis of the estimation time, the scheduling unit 15 changes the execution order of tasks of the requests and determines the image signal processing unit CE as an execution destination. In such a manner, the operation efficiency of the image signal processing unit CE can be improved, and high execution efficiency can be obtained.

In this case, the estimation time is estimated on the basis of the codec parameters in the variable-length code processing unit VLC. Consequently, the estimation precision can be improved and, also in the case where the process time fluctuates, scheduling can be properly made so that a task can be completed by the target completion time.

More concretely, the estimating unit 16 obtains the number of bus access times of the image signal processing unit CE on the basis of the codec parameters. On the basis of the number of bus access times, the estimating unit 16 estimates estimation time. Therefore, the estimation time can be obtained easily and accurately. Further, the estimating unit 16 corrects the estimation time with process time required to execute a task of the last time by the image signal processing unit CE. In such a manner, the estimation precision can be improved.

In the case where scheduling cannot be performed so that the task is finished by the target completion time, the scheduling is performed on the basis of preset priority. Therefore, scheduling can be performed properly. That is, content having high priority can be reproduced.

Estimation Time Estimating Process 1

Referring again to FIG. 4, an example of the estimating process for obtaining estimation time from the number of bus access times will be described. FIG. 4 is a graph illustrating the relation between the number of bus access times and the estimation time. In FIG. 4, the tilt of the straight line (broken line in FIG. 4) before a feedback correction and that of the straight line (solid line in FIG. 4) after a feedback correction are different from each other.

For example, when the relation between the number of bus access times and the estimation time before the feedback correction is linear, the following equation (1) is obtained.

$$t = ax + b \tag{1}$$

Here, t denotes estimation time before the feedback correction, x denotes the number of bus access times, and "a" and "b" indicate arbitrary constants. In FIG. 4, "a" in Equation (1) indicates the tilt, and "b" indicates intercept. In the estimating process 1, the constant "b" is fixed. The constant "a" is corrected by using time require for the process of the immediately preceding task. For example, the estimating unit 16 stores the process time of the task already executed by the image signal processing unit CE so as to be associated with the number of bus access times. In the case of estimating the estimation time of the image signal processing unit CE, the estimating unit 16 corrects the tilt "a" by using the process time.

The relation between the number of bus access times and the estimation time after the feedback correction is expressed by the following equation (2).

$$t' = a'x + b \tag{2}$$

Here, t' denotes estimation time after the feedback correction, and a' is a constant indicating the tilt after the correction. In such a manner, on the basis of the process time of the immediately preceding task, the intercept "b" is made constant before and after the correction, and the tilt is corrected. By substituting the number of bus access times into "x" in Equation (2), the estimating unit 16 calculates the estimation time t'. Therefore, the estimation time can be estimated more accurately.

In the above description, the tilt a' is obtained by using the process time of the immediately preceding task. Alternatively, the tilt a' may be obtained by using process times of a plurality of tasks. In this case, using the plurality of process times, an approximate expression indicating the characteristic can be obtained. Further, weighting may be performed in process order of the tasks and approximation may be made. Specifically, it is sufficient to increase weight for process time of a newer task and obtain an approximation equation. In such a manner, the estimation time can be obtained more accurately.

Estimation Time Estimating Process 2

Figure 8:
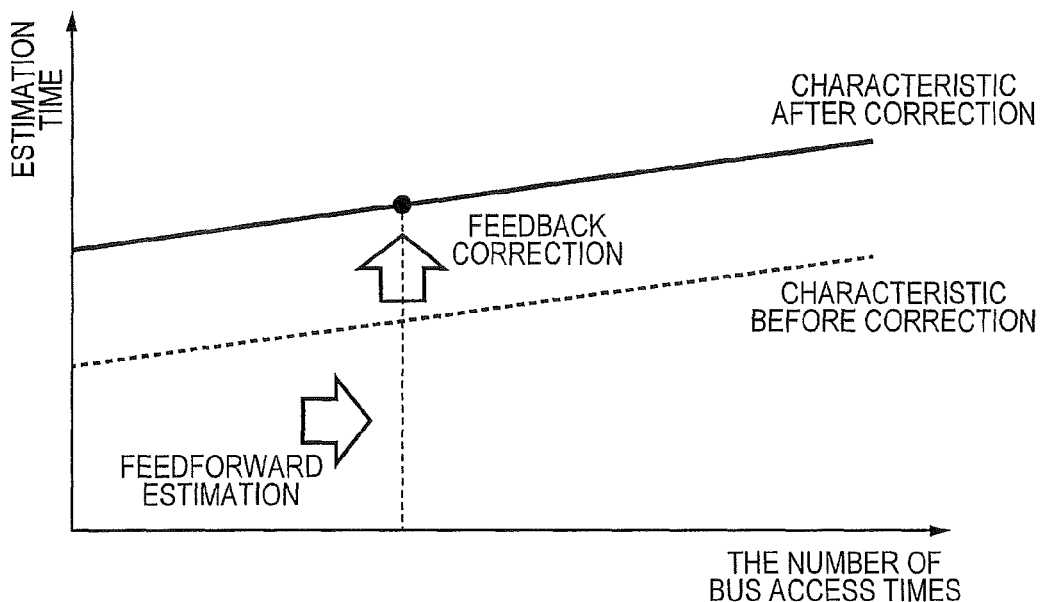
FIG. 8 is a graph illustrating another example of the relation between the number of bus access times and the estimation time.

Next, a modification of the estimation time estimating process will be described with reference to FIG. 8. FIG. 8 is a graph illustrating the relation between the number of bus access times and the estimation time. The graph corresponds to FIG. 4. In FIG. 8, the intercept of the straight line (broken line in FIG. 8) before a feedback correction and that of the straight line (solid line in FIG. 8) after a feedback correction are different from each other.

When it is assumed that the relation between the number of bus access times and the estimation time before the feedback correction is expressed by the above equation (1), the relational expression after correction is expressed as the following equation (3).

$$t' = ax + b' \tag{3}$$

Here, t' denotes estimation time after the feedback correction, and b' denotes a constant indicating the intercept after correction. In such a manner, on the basis of the process of the immediately preceding task, the tilt "a" is made constant before and after the correction, and the intercept is corrected. By substituting the number of bus access times into "x" in Equation (3), the estimating unit 16 calculates the estimation time t'. Therefore, the estimation time can be estimated more accurately.

In the above description, the intercept b' is obtained by using the process time of the immediately preceding task. Alternatively, the intercept b' may be obtained by using process times of a plurality of tasks. In this case, using the plurality of process times, an approximate expression indicating the characteristic can be obtained. Further, weighting may be performed in process order of the tasks and approximation may be made. Specifically, it is sufficient to increase weight for process time of a newer task and obtain an approximation equation. In such a manner, the estimation time can be obtained more accurately.

Estimation Time Estimating Process 3

Figure 9:
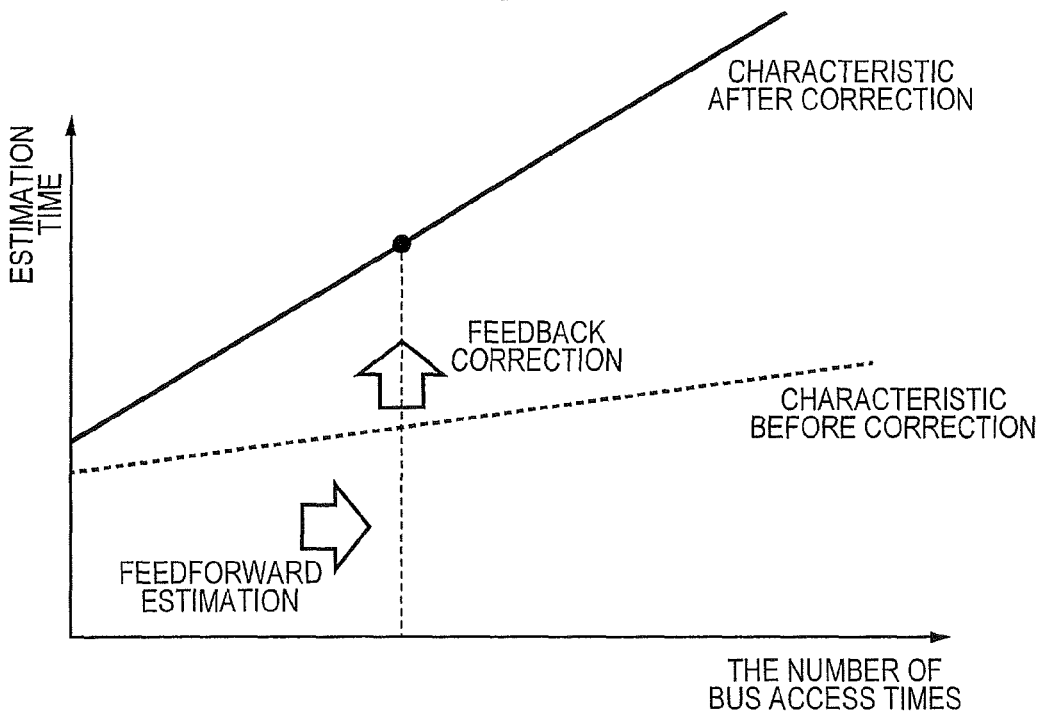
FIG. 9 is a graph illustrating another example of the relation between the number of bus access times and the estimation time.

Another modification of the estimation time estimating process will be described with reference to FIG. 9. FIG. 9 is a graph illustrating the relation between the number of bus access times and the estimation time. The graph corresponds to FIG. 4. In FIG. 9, the intercept and tilt of the straight line (broken line in FIG. 9) before a feedback correction and those of the straight line (solid line in FIG. 9) after a feedback correction are different from each other.

When it is assumed that the relation between the number of bus access times and the estimation time before the feedback correction is expressed by the above equation (1), the characteristic after correction is expressed as the following equation (4).

$$t' = a'x + b' \tag{4}$$

Here, t' denotes estimation time after the feedback correction, a' denotes a constant indicating the tilt after correction, and b' is a constant indicating the intercept after correction. In such a manner, on the basis of the process time of a task executed, the tilt and the intercept are corrected. By substituting the value of "x" into Equation (4), the estimating unit 16 calculates the estimation time t'. Therefore, the estimation time can be estimated more accurately. The tilt a' and the intercept b' may be obtained by using process times of a plurality of tasks. In this case, using the plurality of process times, an approximate expression indicating the characteristic can be obtained. Further, weighting may be performed in process order of the tasks and approximation may be made. Specifically, it is sufficient to increase weight for process time of a newer task and obtain an approximation equation. In such a manner, the estimation time can be obtained more accurately.

Estimation Time Estimating Process 4

Figure 10:
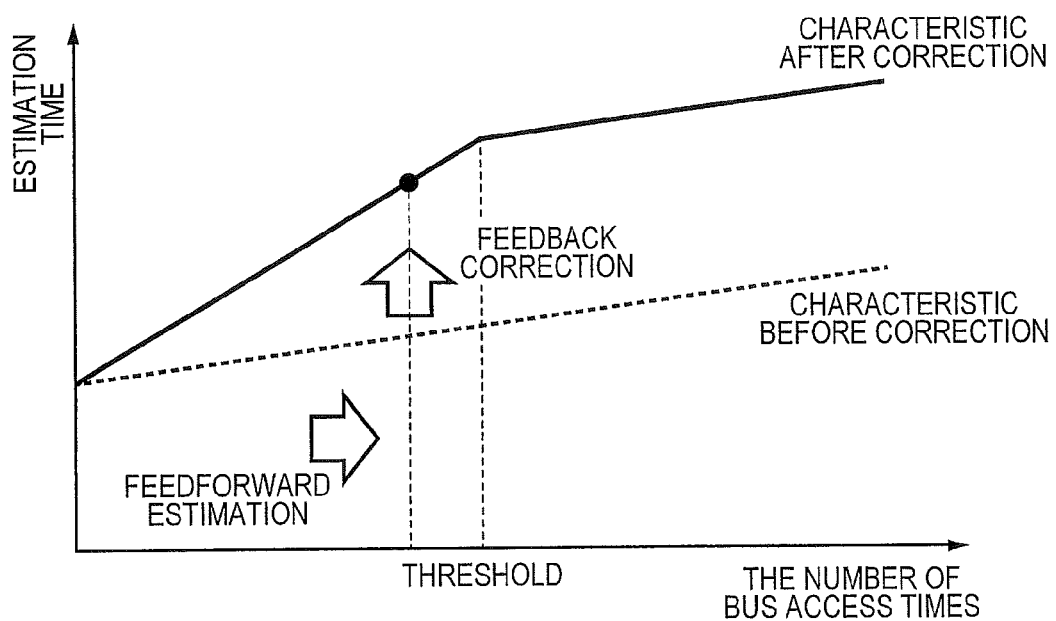
FIG. 10 is a graph illustrating another example of characteristics of the number of bus access times and estimation time.

Another modification of the estimation time estimating process will be described with reference to FIG. 10. FIG. 10 is a graph illustrating the relation between the number of bus access times and the estimation time. The graph corresponds to FIG. 4. In FIG. 10, the tilt of the characteristic is changed according to the magnitude relation between the number of bus access times and the threshold. For example, in the case where the number of bus access times is larger than the threshold, the tilt "a" before correction is made constant and the intercept is corrected. On the other hand, in the case where the number of bus access times is equal to or less than the threshold, the intercept "b" before correction is made constant, and the tilt is corrected. In such a manner, the estimation time can be estimated more accurately. By using process times of a plurality of tasks, a feedback correction can be performed as illustrated in FIG. 10.

In the estimating processes 1 to 4, the tilt a' and the intercept b' after correction may be different values according to the image signal processing unit CE. In this case, the feedback correction is performed for each of the image signal processing units CE0 to CE2. Specifically, using process times in the image signal processing units CE0 to CE2, the image signal processing units CE0 to CE2 may be feedback corrected independently of one another. Different tilts a' or intercepts b' are obtained for the image signal processing units CE0 to CE2. Alternatively, the tilt a' or intercept b' may be commonly used by the image signal processing units CE0 to CE2. That is, the image signal processing units CE0 to CE2 may be feedback-corrected in a lump. In this case, it is sufficient to use an average value of the tilts a' and the intercepts b' obtained for the image signal processing units CE0 to CE2.

Although the relation of the number of bus access times and the estimation time is linear in the above description, it may be a polynomial of the second or higher order terms. That is, the relation between the number of bus access times and the estimation time may be approximated by the polynomial.

Second Embodiment

Figure 11:
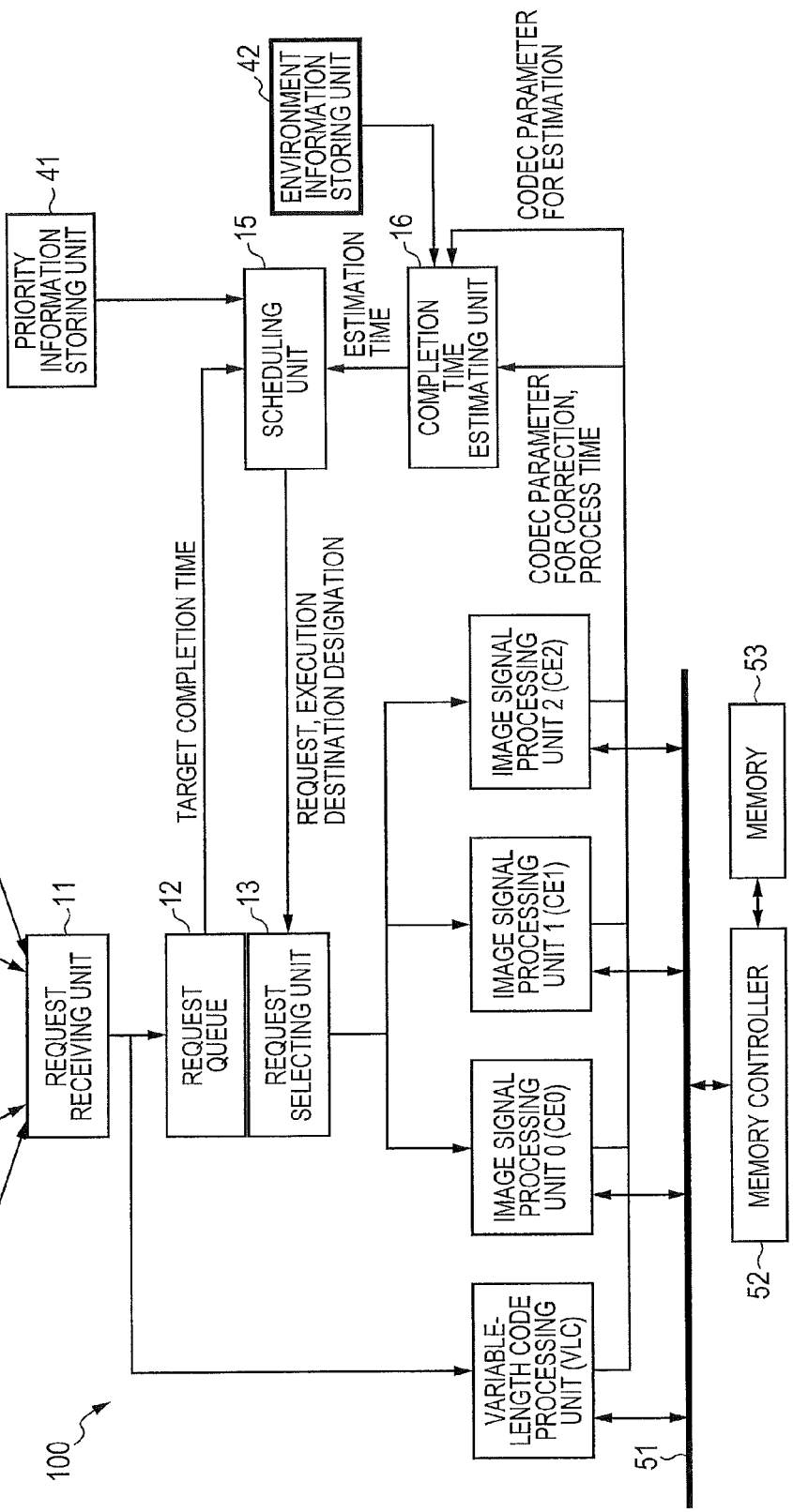
FIG. 11 is a block diagram illustrating the configuration of an image processing apparatus according to a second embodiment.

The image processing apparatus 100 according to a second embodiment will be described with reference to FIG. 11. FIG. 11 is a block diagram illustrating the configuration of the image processing apparatus 100. In the embodiment, different from the first embodiment, an environment information storing unit 42 is added. Since the configuration and process except for the environment information storing unit 42 are similar to those of the first embodiment, the description will not be repeated.

Figure 12:
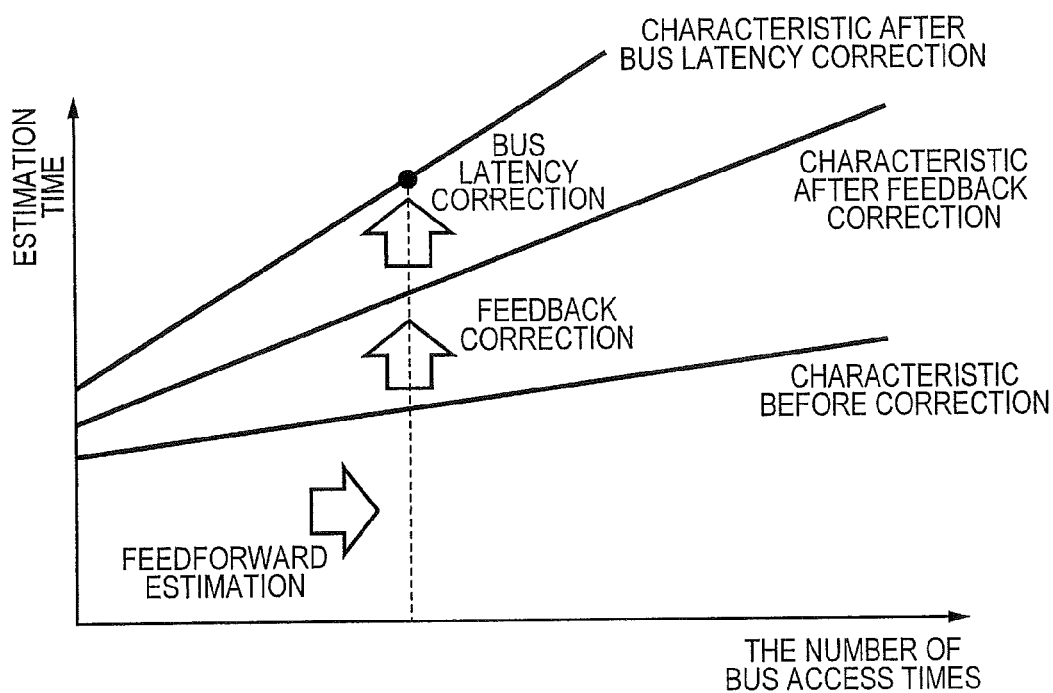
FIG. 12 is a graph illustrating an example of the relation between the number of bus access times and estimation time.

In the embodiment, using the environment information on the outside, a value estimated by the estimating unit 16 is corrected. For example, an average value of delay time (latency) of a bus accessed by the image signal processing unit CE just before is used as environment information. By using the bus latency, the characteristic for obtaining estimation time from the number of bus accesses times is corrected. FIG. 12 illustrates a characteristic example when the bus latency is used for correction.

In FIG. 12, the characteristic which is feedback-corrected is further corrected by using the bus latency. In this case, on the basis of the bus latency, the tilt and the intercept of the relation between the number of bus access times and estimation time are corrected. For example, the larger the bus latency is, the longer the task process time becomes, so that the tilt and the intercept are increased. Obviously, one of the tilt and the intercept may be corrected by the bus latency.

The bus latency changes according to the operation state of a CPU or 3D graphics which is not illustrated in FIG. 4. That is, the bus latency changes according to density of data in the data bus 51.

For example, the bus latency can be obtained by actual write/read time in which data is written/read to/from the memory 53. That is, according to the since a data write/read request by the image signal processing unit CE to a response, the bus latency can be obtained.

According to the control method of the embodiment, the estimation time is estimated by using the bus latency. More concretely, the estimation time is corrected by using the bus latency. Therefore, even when the estimation time fluctuates due to an external factor, the estimation precision can be improved. For example, the latency of the memory bus expresses congestion degree of the data bus 51. When the bus latency is used, the process time can be estimated in proportion to the congestion degree. Specifically, it can be estimated that when the congestion degree is low, a task completes fast and when the congestion degree is high, a task completes late. Even when the bus latency fluctuates with time, precise estimation can be performed so as to follow the fluctuation.

Third Embodiment

A third embodiment is different from the first and second embodiments with respect to the point of re-scheduling tasks which are reserved for process start but are not yet executed. Since the configuration and the control method of the image processing apparatus 100 are similar to those of the first and second embodiments, the description will not be repeated.

Concretely, in the embodiment, when there is a request which is scheduled to be executed but is not yet executed, an image signal processing unit CE which does not perform a process is provided by replacing the request. Specifically, by assigning a task once assigned to an image signal processing unit CE to another image signal processing unit CE, schedule is changed so as to occupy the operation slot of the image signal processing unit CE more.

Figure 13:
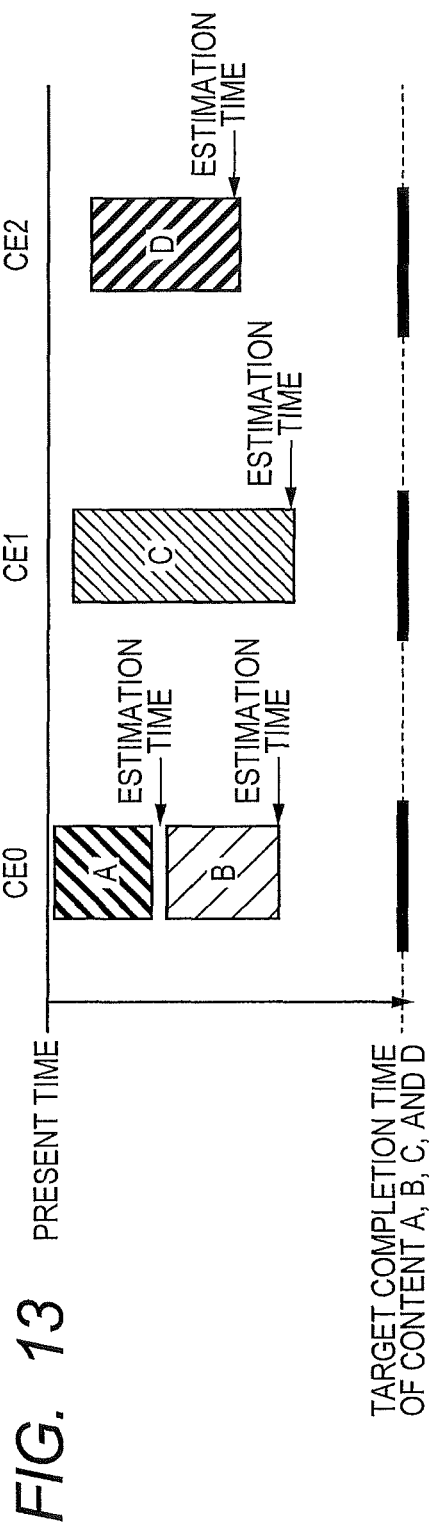
FIG. 13 is a diagram illustrating an example in which rescheduling of a task is not performed.

The process of the third embodiment will be described with reference to FIGS. 13 to 18. FIGS. 13 to 18 are diagrams for explaining scheduling in the embodiment. FIG. 13 is a diagram illustrating the operation in the case where requests are not changed. As illustrated in FIG. 13, in the case where requests are not changed, tasks A and B are assigned to the image signal processing unit CE0. The image signal processing unit CE0 executes the task A and then the task B. A task C is assigned to the image signal processing unit CE1, and a task D is assigned to the image signal processing unit CE2.

In FIG. 13, there is space in the operation slot in each of the image signal processing units CE0 to CE2. That is, all of the image signal processing units CE0 to CE2 can complete the tasks A to D in a state where there is allowance by the target completion time. In a state where there is space in the operation slot, all of the image signal processing units CE operate. In the embodiment, an image signal processing unit CE which does not operate by changing the assignment of scheduled tasks is provided.

Figure 14:
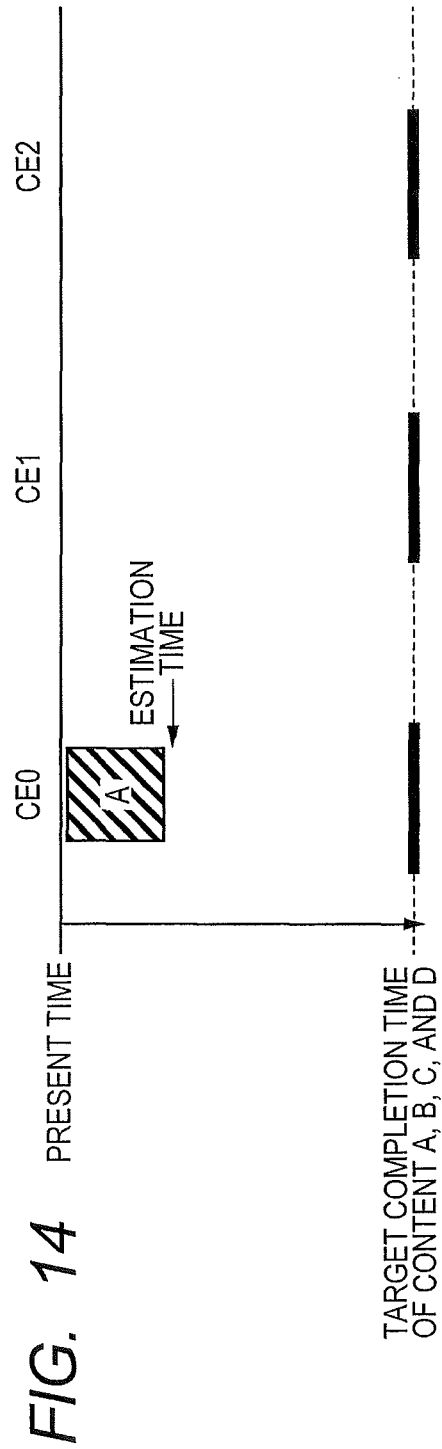
FIG. 14 is a diagram for explaining a scheduling method according to a third embodiment.

Hereinbelow, a process of re-assigning a task so that the image signal processing unit CE2 does not operate will be described. The description will be given on assumption that requests are received in order of A, B, C, and D. When the request A is received by the request receiving unit 11, the estimating unit 16 estimates estimation time of the task A. Since no task is assigned to any of the image signal processing units CE0 to CE2, the scheduling unit 15 assigns the task A to the image signal processing unit CE0 (FIG. 14). The image signal processing unit CE0 executes the task A.

Next, when the request receiving unit 11 receives the request B, the estimating unit 16 estimates estimation time of the task B. From the estimation time of the tasks A and B, the scheduling unit 15 can determine that the image signal processing unit CE0 can be scheduled for the task B. Specifically, the scheduling unit 15 determines that even when the image signal processing unit CE0 processes the task B after the task A, the task B can be completed by the target completion time. Therefore, the scheduling unit 15 assigns the task B to the image signal processing unit CE0 (FIG. 15). That is, the process start of the task B is scheduled in the image signal processing unit CE0.

Next, the request receiving unit 11 receives the request C before the process start of the task B. Then, the estimating unit 16 estimates process time of the task C. When the tasks are not changed like in the first embodiment, as illustrated in FIG. 16, the task C is assigned to the image signal processing unit CE1. Specifically, when the image signal processing unit CE0 executes the task C after the tasks A and B, the task C is not completed by the target completion time. In the case where re-scheduling described in the embodiment is not performed, on the basis of the estimation times of the tasks A to C, the scheduling unit 15 assigns the task C to the image signal processing unit CE1 as illustrated in FIG. 16.

However, by replacing the tasks B and C, the image signal processing unit CE0 can be effectively used. Therefore, in the embodiment, as illustrated in FIG. 17, the assignment destination of the task B is changed from the image signal processing unit CE0 to the image signal processing unit CE1 and the task C is assigned to the image signal processing unit CE0. That is, the scheduling unit 15 schedules process start of the task C in the image signal processing unit CE0 and makes the image signal processing unit CE1 execute the task B. As described above, when the image signal processing unit CE0 executes the task A and then the task C, the empty slot of the image signal processing unit CE becomes smaller than that in the case of executing the task A and then the task B. Therefore, the image signal processing unit CE0 can be effectively used.

When the request C is received before the image signal processing unit CE0 starts the process of the task B, the estimation time of the task B and that of the task C are compared. The estimation time of the task B and that of the task C are compared. Specifically, when a new request C is received during the period since the task B is assigned to the image signal processing unit CE1 until it is executed, the estimation time of the task C for the new request C is compared with the estimation time of the task B. A determination is made to see which is more efficient between the case where the image signal processing unit CE0 processes the task B and the case where the image signal processing unit CE0 processes the task C. The scheduling unit 15 performs scheduling so that the image signal processing unit CE0 can be used more efficiently.

When the request D is received before the image signal processing unit CE0 starts the process of the task C, the estimating unit 16 estimates the estimation time of the task D. In a manner similar to the above, the estimation time of the task D is compared with the estimation time of the task C. On the basis of the comparison result of the process times, as illustrated in FIG. 18, the scheduling unit 15 assigns the task D to the image signal processing unit CE1. Specifically, the process time of the task D is shorter than that of the task C. Therefore, when the task D is assigned to the image signal processing unit CE0 in place of the task C, the empty slot of the image signal processing unit CE0 increases. Therefore, the tasks D and C are not replaced with each other. Even when the task D is assigned after the task B in the image signal processing unit CE1, the task D is completed by the target completion time. Therefore, the task D is assigned to the image signal processing unit CE1.

By the above operation, no task is assigned to the image signal processing unit CE2. That is, the image signal processing unit CE2 always have the empty slot and does not operate. For the image signal processing unit CE2, clock stop and power supply stop can be applied. In such a manner, power consumption can be reduced. Further, the processes of all of the tasks A to D are completed by the target completion time. Therefore, the image processing apparatus 100 can reproduce the content A to D without a frame drop.

Figure 19:
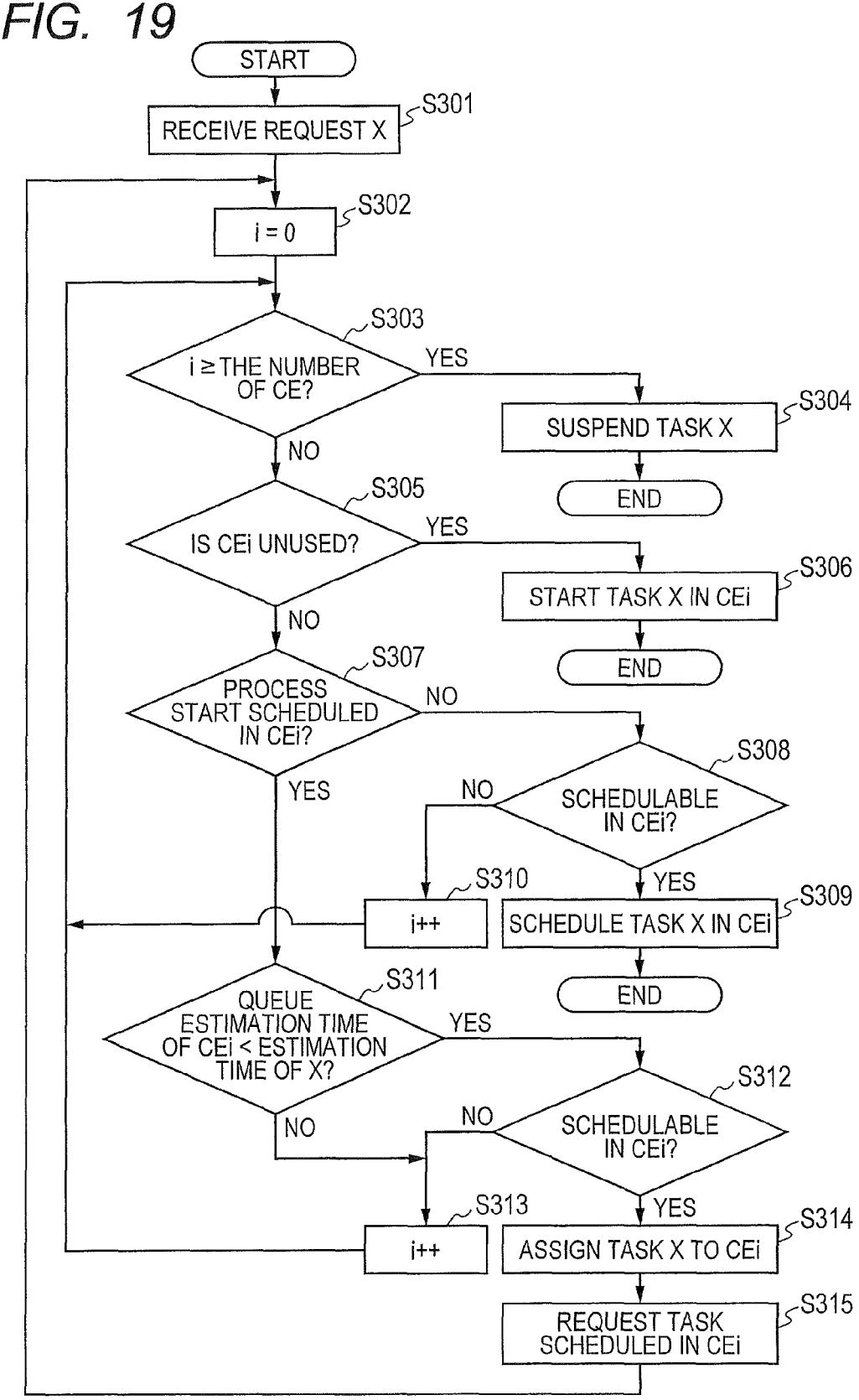
FIG. 19 is a flowchart illustrating a scheduling process in the image processing apparatus according to the third embodiment.

Referring to FIG. 19, the scheduling method of the embodiment will be described. FIG. 19 is a flowchart illustrating the scheduling method according to the embodiment. The description of parts similar to those in the flow illustrated in FIG. 5 of the first embodiment will not be repeated.

When a new request X is received (S301), i=0 is set (S302). In the following description, the task of the request X will be described as the task X. Next, whether i is equal to or larger than the number of pieces of the image signal processing units CE is determined (S303). When i is equal to or larger than the number of pieces of the image signal processing units CE (YES in S303), the process of the task X is suspended (S304). Then, assignment of the task X is finished. In the case where the process is suspended, a new request is received and, after that, whether the task X whose process is suspended can be scheduled or not may be determined. When i is not equal to or larger than the number of pieces of the image signal processing units CE (NO in S303), whether the image signal processing unit CEi is unused or not is determined (S305).

When the image signal processing unit CEi is unused (YES in S305), the image signal processing unit CEi starts processing of the task X (S306). After that, the assignment of the task X is finished. When the image signal processing unit CEi is not unused (NO in S305), whether the process start is set in the image signal processing unit CEi or not is determined (S307). That is, a task scheduled in the image signal processing unit CEi is recognized. The scheduling unit 15 determines whether or not a task which is not yet executed and whose process start is scheduled exists in the image signal processing unit CEi.

When there is no task whose process start is scheduled in the image signal processing unit CEi (NO in S307), that is, when there is no process start scheduled in the image signal processing unit CEi, the scheduling unit 15 determines whether the task X can be scheduled in the image signal processing unit CEi or not (S308). That is, when the task X is assigned to the image signal processing unit CEi, the scheduling unit 15 determines whether the task X can be executed by the target completion time or not.

When the task X can be scheduled in the image signal processing unit CEi (YES in S308), that is, when the image signal processing unit CEi can complete the task X by the target completion time, the scheduling unit 15 schedules the process start of the task X in the image signal processing unit CEi (S309). After that, assignment of the task X is finished. On the other hand, when the task X cannot be scheduled in the image signal processing unit CEi (NO in S308), that is, when the image signal processing unit CEi cannot complete the task X by the target completion time, i is incremented (S310), and the routine returns to the step S303. By repeating the processes in steps S303, S305, S307, S308, S310, and the like, the image signal processing unit CE which can execute the task X or in which process start of the task X can be scheduled can be retrieved from the image signal processing units CE0 to CE2.

When there is the process start schedule in the image signal processing unit CEi (YES in S307), that is, when there is the task scheduled in the image signal processing unit CEi, whether queue estimation time of the image signal processing unit CEi is shorter than the estimation time of the task X or not is determined (S311). That is, the scheduling unit 15 compares the estimation time of a task whose process start is scheduled (hereinbelow, called a task Y) and the estimation time of the task X.

When the queue estimation time of the image signal processing unit CEi is not shorter than the estimation time of the task X (NO in S311), i is incremented (S313). That is, when the process time of the task Y is longer than that of the task X, without changing the schedule, i is incremented. After i is incremented, the program returns to step S303. When the process time of the task Y is longer than that of the new task X, by executing the task Y by the image signal processing unit CEi, the slot of the image signal processing unit CEi can be effectively used. Therefore, without changing the schedule of the image signal processing unit CEi, i is incremented. By executing the process from step S303, whether the task X can be assigned to the next image signal processing unit CE or not can be determined.

When the queue estimation time of the image signal processing unit CEi is shorter than the estimation time of the task X (YES in S311), whether the task X can be scheduled in the image signal processing unit CEi or not is determined (S312). That is, in the case of assigning the task X to the image signal processing unit CEi in place of the task Y whose process start is scheduled, the scheduling unit 15 determines whether the image signal processing unit CEi can complete the task X by the target completion time or not.

When the task X cannot be scheduled in the image signal processing unit CEi (NO in S312), i is incremented (S313), and the program returns to step S303. Specifically, when the process start of the task X is scheduled in the image signal processing unit CEi, the task X is not completed by the target completion time. Consequently, the task X is not assigned to the image signal processing unit CEi. In other words, the process start of the task Y remains scheduled in the image signal processing unit CEi. After i is incremented, by executing the process from step S303, whether the task X can be assigned in the next image signal processing unit CE or not can be determined.

On the other hand, when the task X can be scheduled in the image signal processing unit CEi (YES in S312), the task X is assigned to the image signal processing unit CEi (S314). Specifically, the scheduling unit 15 schedules the process start of the task X in the image signal processing unit CEi. Further, before the scheduling of the process start of the task X, the task Y scheduled in the image signal processing unit CEi is requested (S315). After that, the program returns to step S302. That is, the scheduling unit 15 re-assigns the task Y in the image signal processing unit CEi by a process similar to the above. By the operation, the task Y whose process start is scheduled in the image signal processing unit CEi is assigned to another image signal processing unit CE. Specifically, the process from step S302 is performed on the task Y whose request is received before the task X, and the task Y is rescheduled.

In the embodiment, a task whose process start is scheduled but which is not yet executed is re-assigned by the image signal processing unit CE. By controlling the image processing apparatus 100 as described above, the image signal processing unit CE2 which is not operating can be provided. Specifically, in the case where re-scheduling of a task is not performed, as illustrated in FIG. 13, the task D is assigned to the image signal processing unit CE2. On the other hand, in the case of performing re-scheduling of a task, as illustrated in FIG. 18, no task is assigned to the image signal processing unit CE2. To the image signal processing unit CE which is not operating, clock stop and power supply stop is applied. Consequently, power consumption can be reduced. Moreover, processes of all of the tasks A to D are completed by the target completion time. Therefore, the content A to D can be reproduced without a frame drop.

As described above, when a new request is received, re-scheduling is performed. Consequently, each time a request is received, proper schedule can be set. Therefore, while maintaining operation efficiency, the image signal processing unit CE which is not operating can be provided.

Figure 20:
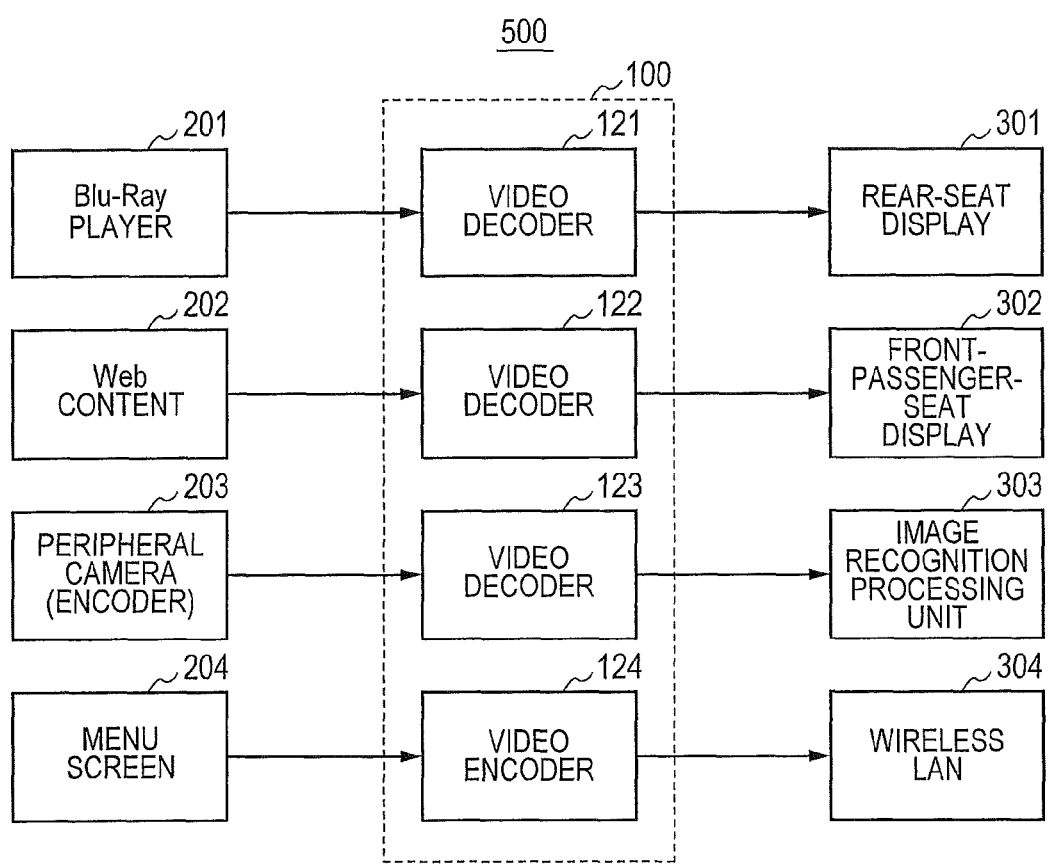
FIG. 20 is a block diagram illustrating an in-vehicle system using an image processing apparatus.

An application example of the image processing apparatus according to the first to third embodiments will be described with reference to FIG. 20. FIG. 20 is a block diagram schematically illustrating an in-vehicle system to which the image processing apparatus 100 is applied. An in-vehicle system 500 has a Blu-ray player 201, a web content 202, a peripheral camera 203, and a menu screen 204 as request sources. Further, the in-vehicle system 500 also has the image processing apparatus 100, a rear-seat display 301, a front-passenger-seat display 302, an image recognition processing unit 303, and a wireless LAN 304.

The Blue-ray player 201, the web content 202, the peripheral camera 203, and the menu screen 204 are request sources of content described in the first to third embodiments. The image processing apparatus 100 has video decoders 121 to 123 and a video encoder 124. The video decoders 121 to 123 and the video encoder 124 correspond to the image signal processing units CE described in the first to third embodiments.

The rear-seat display 301 displays video data reproduced by the Blu-ray player 201. The front-passenger-seat display 302 displays video data reproduced by web content. The image recognition processing unit 303 performs image recognition on video data obtained by the peripheral camera 203. The video encoder 124 encodes a menu screen. The wireless LAN 304 transmits encoded data.

As described above, the video decoders 121 to 123 and the video encoder 124 correspond to the image signal processing units CE. Therefore, the video decoders 121 to 123 and the video encoder 124 execute processes in accordance with schedule determined by the scheduling unit 15 illustrated in FIG. 1. That is, image processing apparatus 100 performs scheduling on the basis of estimation time.

In the case where the performances required to processes vary or in the case where the process amount varies in the time direction, the scheduling method works effectively.

Fourth Embodiment

Figure 21:
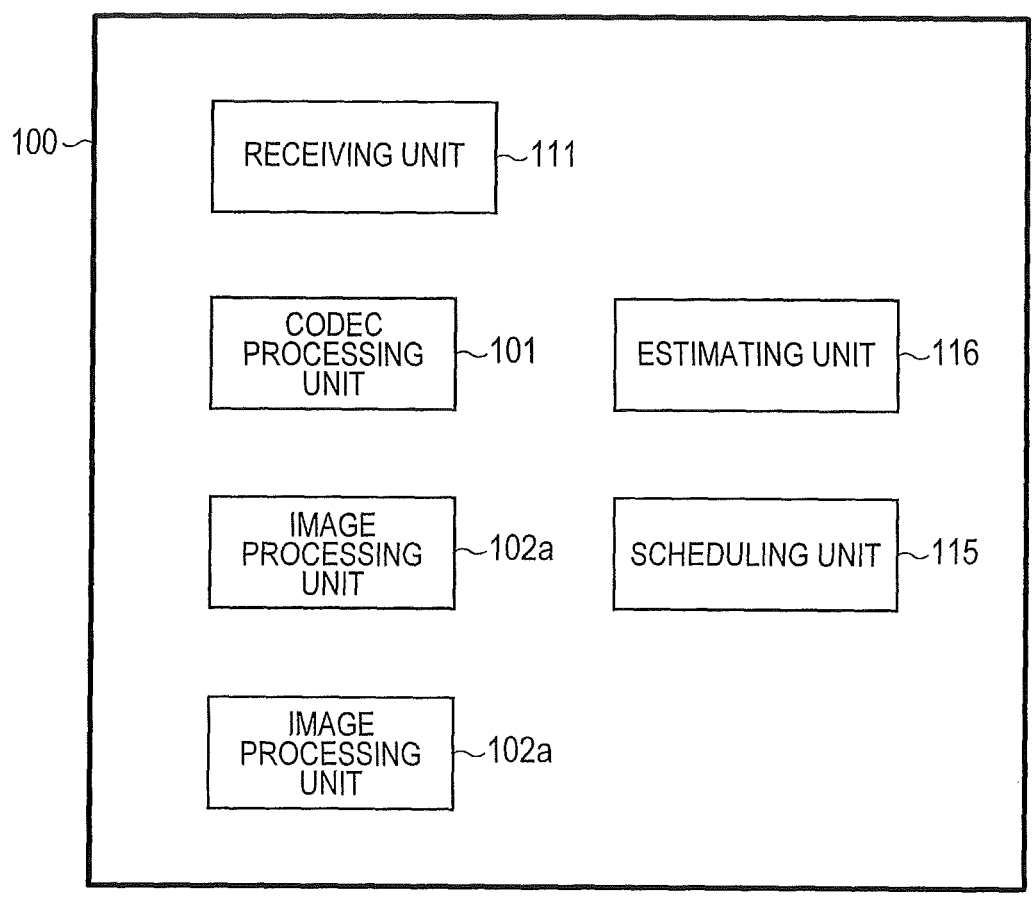
FIG. 21 is a block diagram illustrating the configuration of an image processing apparatus according to a fourth embodiment.

The image processing apparatus 100 according to a fourth embodiment will be described with reference to FIG. 21. The image processing apparatus has a receiving unit 111, a codec processing unit 101, a plurality of image processing units 102, an estimating unit 116, and a scheduling unit 115.

The receiving unit 111 receives requests from a plurality of content. The codec processing unit 101 decodes or encodes content. Image processing units 102a and 102b execute tasks according to requests in parallel. The estimating unit 116 estimates estimation time at which a process of a task is completed in each of the image processing units 102 on the basis of a decode or encode parameter used in the codec processing unit. The scheduling unit 115 schedules tasks to be executed by the plurality of image processing units 102 on the basis of the estimation time estimated by the estimating unit 116. Although the number of image processing units 102a and 102b is two in FIG. 21, the number of the image processing units 102 may be three or more.

The receiving unit 111 may perform a process similar to that of the request receiving unit 11 in the foregoing embodiment. The codec processing unit 101 may perform a process similar to that of the variable-length code processing unit VLC in the foregoing embodiment. The estimating unit 116 may perform a process similar to that of the estimating unit 16 of the foregoing embodiment. The image processing unit 102 may perform a process similar to that of the image signal processing unit CE in the foregoing embodiment. The scheduling unit 115 may perform a process similar to that of the scheduling unit 15 in the foregoing embodiment.

Other Embodiments

In the first to third embodiments, the image signal processing units CE0 to CE2 can be applied also to the case of processing different frames of the same content A in parallel. The invention can be also applied to the case where there is only one signal processing unit in each of the embodiments. The process unit of the image signal processing unit CE is not limited to a frame unit but may be a macro block or a GOP (Group Of Pictures) unit made of a plurality of frames. Although the example that the image signal processing unit CE is a decoder has been described, the invention can be similarly applied to the case where the image signal processing unit CE is an encoder.

The embodiment is suitable to a semiconductor device having a function of simultaneously compressing/decompressing a plurality of frames of a plurality of videos or the same video and a system using the same. In an apparatus performing a simultaneous process on a plurality of frames of a plurality of videos or the same video, an efficient operation method of a plurality of pieces of hardware can be obtained. Particularly, in a process having a characteristic that the process amount largely fluctuates depending on content of input signals like a video coding/decoding process, scheduling which makes the operation efficiency of the hardware higher than that in the related art can be realized.

Two or more embodiments in the first to fourth embodiments can be properly combined and used. For example, scheduling may be performed by using both the environment information of the first embodiment and the priority information of the second embodiment. Alternatively, in the control method of the image processing apparatus described in the third embodiment, the priority information described in the first embodiment and the environment information described in the second embodiment may be used. Any number of image signal processing units CE and the image processing units 102 may be used as long as it is plural and is, for example, four or more. Although the target completion time of the requests A to D is the same in the above description, even the target completion times are different, a similar effect can be obtained.

Although the invention achieved by the present inventors has been concretely described on the basis of the embodiments, obviously, the present invention is not limited to the above-described embodiments but can be variously modified without departing from the gist.

What is claimed is:

1. An image processing apparatus comprising:
   a receiving unit that receives requests from a plurality of pieces of content;
   a codec processing unit that decodes or encodes the content;
   a plurality of image processing units executing tasks according to the requests in parallel;
   an estimating unit that estimates estimation time in which a process of the task is completed in each of the image processing units on the basis of a parameter of decoding or encoding used in the codec processing unit; and
   a scheduling unit that schedules tasks to be executed by the plurality of image processing units on the basis of the estimation time estimated by the estimating unit,
   wherein the number of access times that the image processing unit accesses a bus is obtained on the basis of the parameter, and the estimation time is estimated on the basis of the number of access times.

2. The image processing apparatus according to claim 1, wherein the estimation time according to the number of access times is corrected by process time required to execute a task of previous time by the image processing unit.

3. The image processing apparatus according to claim 1, wherein the estimating unit estimates the estimation time on the basis of latency of the bus.

4. The image processing apparatus according to claim 3, wherein estimation time according to the number of access times is corrected by latency of the bus.

5. The image processing apparatus according to claim 1, wherein the scheduling unit performs scheduling so that tasks according to the plurality of pieces of content are completed by target completion time.

6. The image processing apparatus according to claim 5, wherein in the case where the tasks according to the plurality of pieces of content cannot be completed by the target completion time, the scheduling unit performs scheduling in accordance with predetermined priority degree.

7. The image processing apparatus according to claim 6, wherein the plurality of image processing units include at least first to third image processing units, and
   wherein the scheduling unit performs scheduling so as to assign a first task to the first image processing unit and, after that, when the first task is not executed yet, assigns the first task to the second image processing unit so as to stop operation of the third image processing unit.

8. The image processing apparatus according to claim 7, wherein in the case where a new request is received during a period since the first task is assigned to the first image processing unit until execution is started, estimation time of a second task for the new request and estimation time of the first task are compared, and wherein according to a comparison result of the estimation times, the first task is assigned to the second image processing unit, and the second task is assigned to the second image processing unit.

9. A control method for an image processing apparatus having a plurality of image processing units executing tasks according to requests in parallel, comprising:
receiving requests from a plurality of pieces of content;
decoding or encoding the content;
estimating estimation time in which a process of the task is completed in each of the image processing units on the basis of a parameter of the decoding or encoding; and
scheduling tasks to be executed by the plurality of image processing units on the basis of the estimation times,
wherein the number of access times that the image processing unit accesses a bus is obtained on the basis of the parameter, and the estimation time is estimated on the basis of the number of access times.

10. The control method according to claim 9, wherein estimation time according to the number of access times is corrected by process time required to execute a task of previous time by the image processing unit.

11. The control method according to claim 9, wherein the estimating unit estimates the estimation time on the basis of latency of the bus.

12. The control method according to claim 11, wherein estimation time according to the number of access times is corrected by latency of the bus.

13. The control method according to claim 9, wherein scheduling is performed so that tasks according to the plurality of pieces of content are completed by the target completion time.

14. The control method according to claim 13, wherein in the case where tasks according to the plurality of pieces of content cannot be completed by the target completion time, scheduling is performed according to predetermined priority degree.

15. The control method according to claim 14,
wherein the plurality of image processing units include at least first to third image processing units, and
wherein scheduling is performed so as to assign a first task to the first image processing unit and, after that, when the first task is not executed yet, by assigning the first task to the second image processing unit, operation of the third image processing unit is stopped.

16. The control method according to claim 15,
wherein after a new request is received, estimation time of a second task for the new request and estimation time of the first task are compared, and
wherein according to a comparison result of the estimation times, the first task is assigned to the second image processing unit, and the second task is assigned to the first image processing unit.

17. The image processing apparatus according to claim 1,
wherein the receiving unit comprises a receiver that receives requests from a plurality of pieces of content,
wherein the codec processing unit comprises a processor that decodes or encodes the content, and
wherein a second processor executing a program stored in a computer readable medium, the second processor configured to execute the estimating unit and the scheduling unit.

18. The image processing apparatus according to claim 1, further comprising a central processor executing a program stored in a computer readable medium, the central processor configured to execute the estimating unit and the scheduling unit,
wherein the central processor estimates estimation time in which the task is completed in each of the plurality of processing units on the basis of a parameter of decoding or encoding and schedules tasks to be executed by the plurality of processing units on the basis of the estimated estimation time.

* * * * *